US006884347B1

(12) United States Patent
Krieger

(10) Patent No.: US 6,884,347 B1
(45) Date of Patent: Apr. 26, 2005

(54) WASTEWATER TREATMENT SYSTEM

(75) Inventor: Joseph P. Krieger, Grand Junction, CO (US)

(73) Assignee: Kriegco Wastewater Systems, Inc., Craig, CO (US)

( * ) Notice: Subject to any disclaimer, the term of this patent is extended or adjusted under 35 U.S.C. 154(b) by 302 days.

(21) Appl. No.: 10/136,784

(22) Filed: Apr. 30, 2002

Related U.S. Application Data
(60) Provisional application No. 60/287,305, filed on Apr. 30, 2001.

(51) Int. Cl.[7] .................................................. C02F 1/24
(52) U.S. Cl. ...................... 210/221.2; 210/201; 210/232
(58) Field of Search ............................. 210/221.2, 703, 210/221.1, 202, 201, 232

(56) References Cited

U.S. PATENT DOCUMENTS

| | | | |
|---|---|---|---|
| 1,903,517 A | * | 4/1933 | Ruth, Jr. ...................... 209/168 |
| 4,923,600 A | * | 5/1990 | Krofta ......................... 210/107 |
| 5,173,184 A | | 12/1992 | Krieger |
| 5,288,737 A | | 2/1994 | Krieger |
| 5,383,241 A | | 1/1995 | Krieger |
| 5,423,981 A | | 6/1995 | Krieger |
| 5,534,159 A | | 7/1996 | Krieger |
| 5,609,769 A | | 3/1997 | Krieger |
| 5,755,973 A | | 5/1998 | Krieger |
| 6,126,815 A | * | 10/2000 | Kelada ......................... 210/94 |

* cited by examiner

Primary Examiner—Thomas M. Lithgow
(74) Attorney, Agent, or Firm—Faegre & Benson LLP

(57) ABSTRACT

Systems and methods for treating wastewater are disclosed. A wastewater treatment apparatus may include an intake unit, one or more gravity separation air flotation units, and a discharge unit. The units or components may be modular and compatible, have standardized sizes, shapes, and configurations, and may be assembled from a limited number of standardized panels having standard size, shape, and configuration. The apparatus may be expandable and allow the insertion of additional modular standardized components made of panels. The intake unit may include a split input manifold and baffle. A gravity separation air flotation unit may contain a raking system for removal of a floc blanket that includes a blade with wheels or rollers that roll along a shelf attached to the unit to distribute the weight of the blade. Sludge containing particulate contaminants separated from the wastewater may be added to a sludge tank that contains a chute and a cutter to assist with adding sludge thickening agents such as diatomaceous earth.

29 Claims, 23 Drawing Sheets

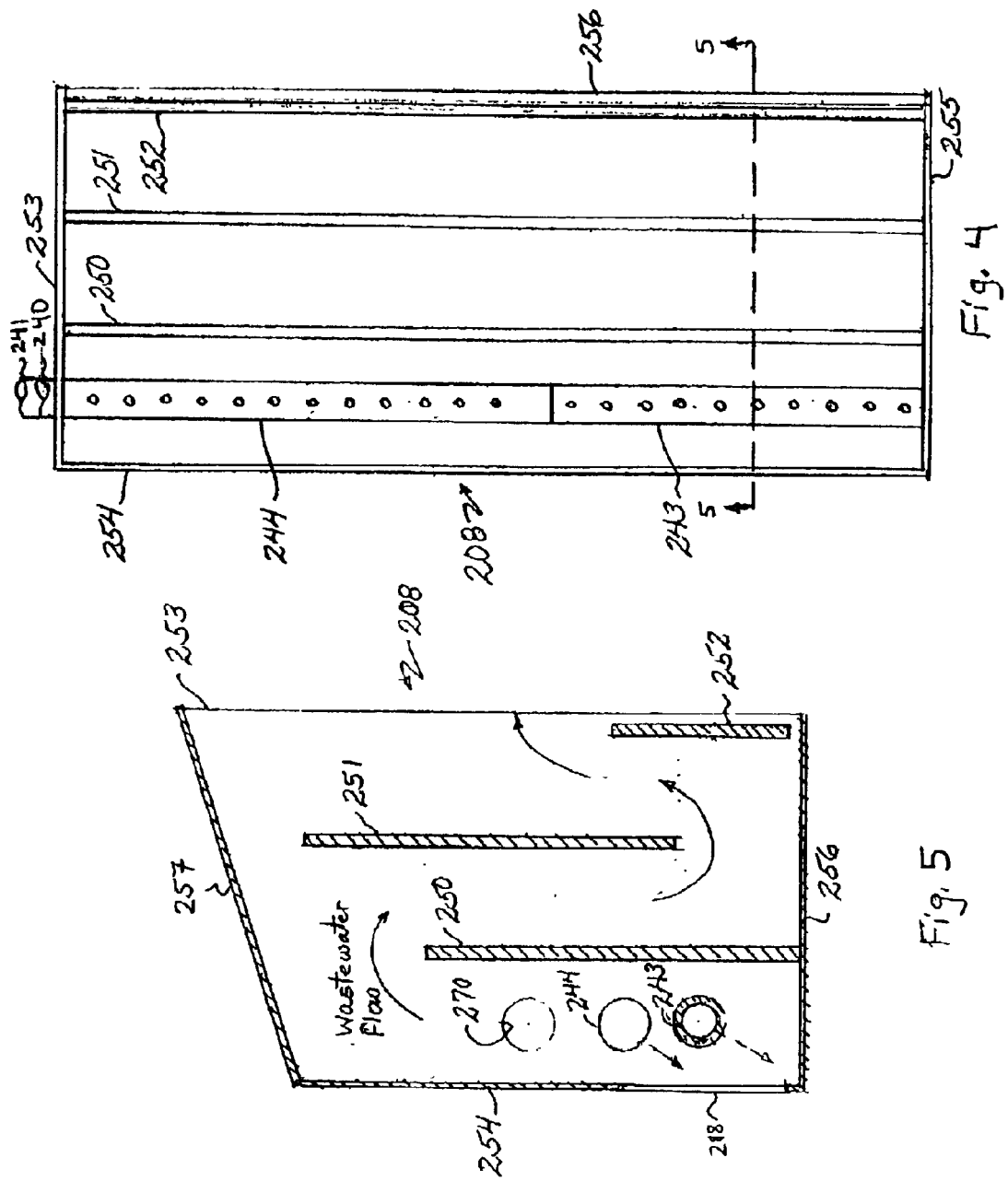

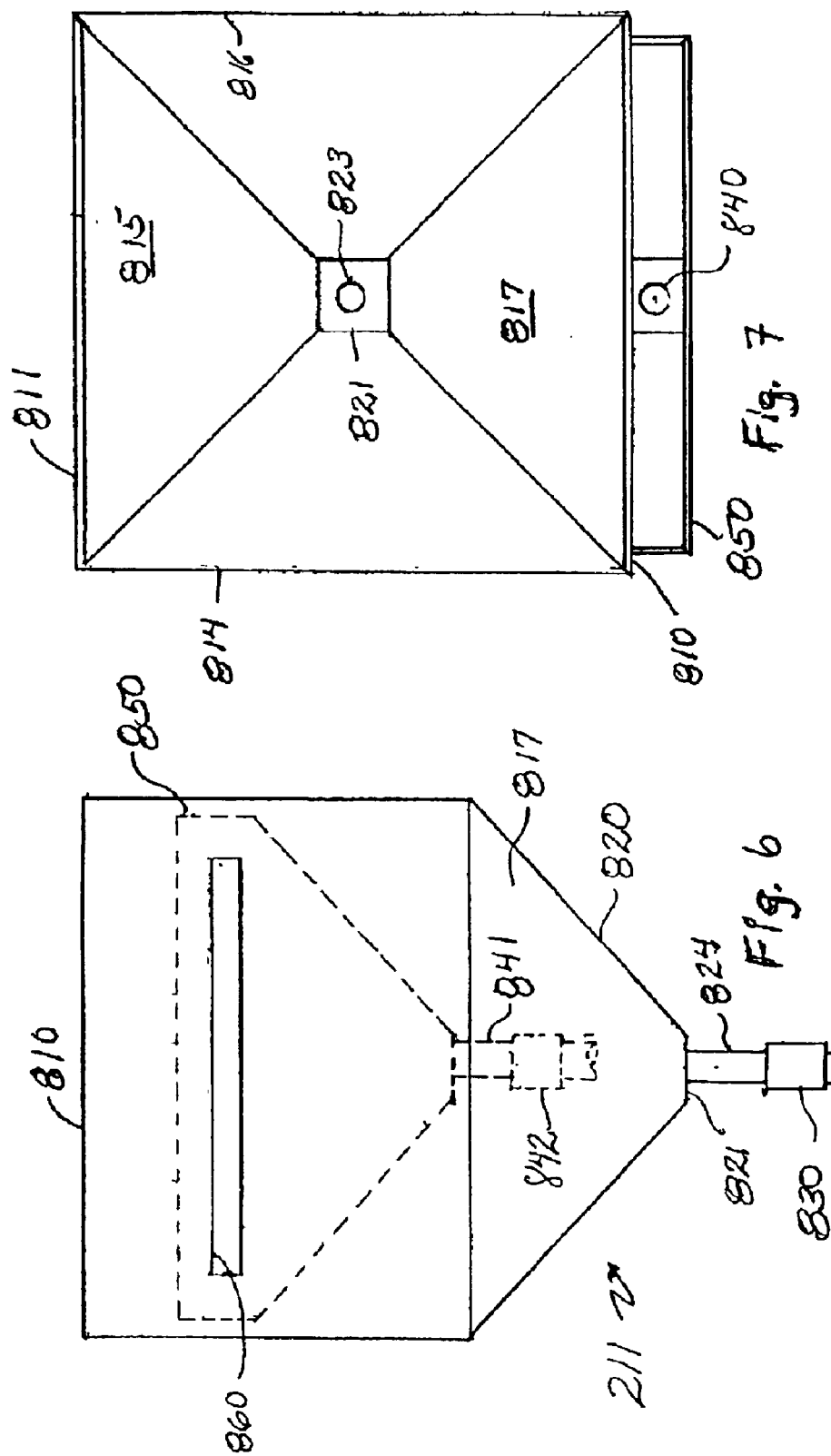

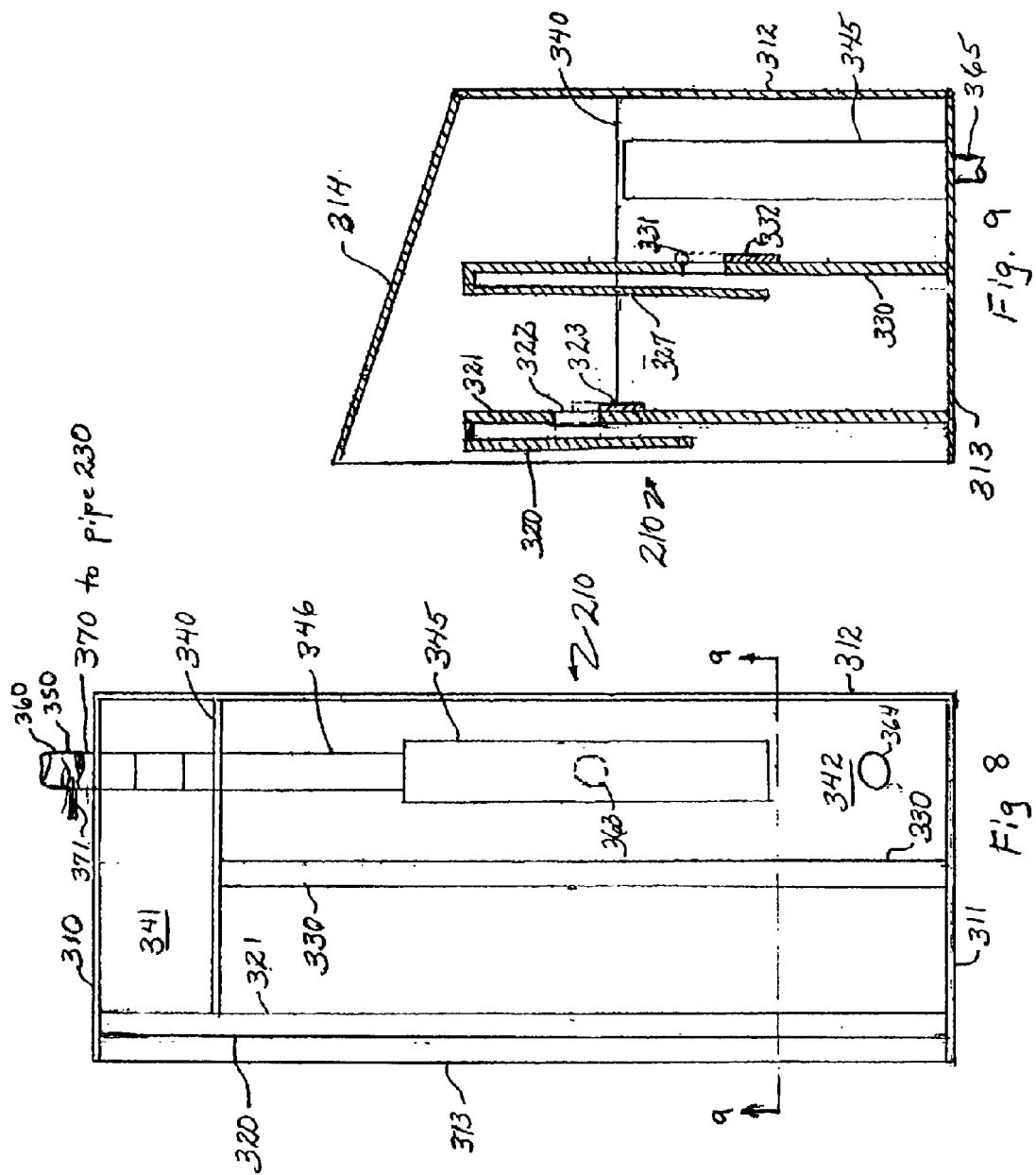

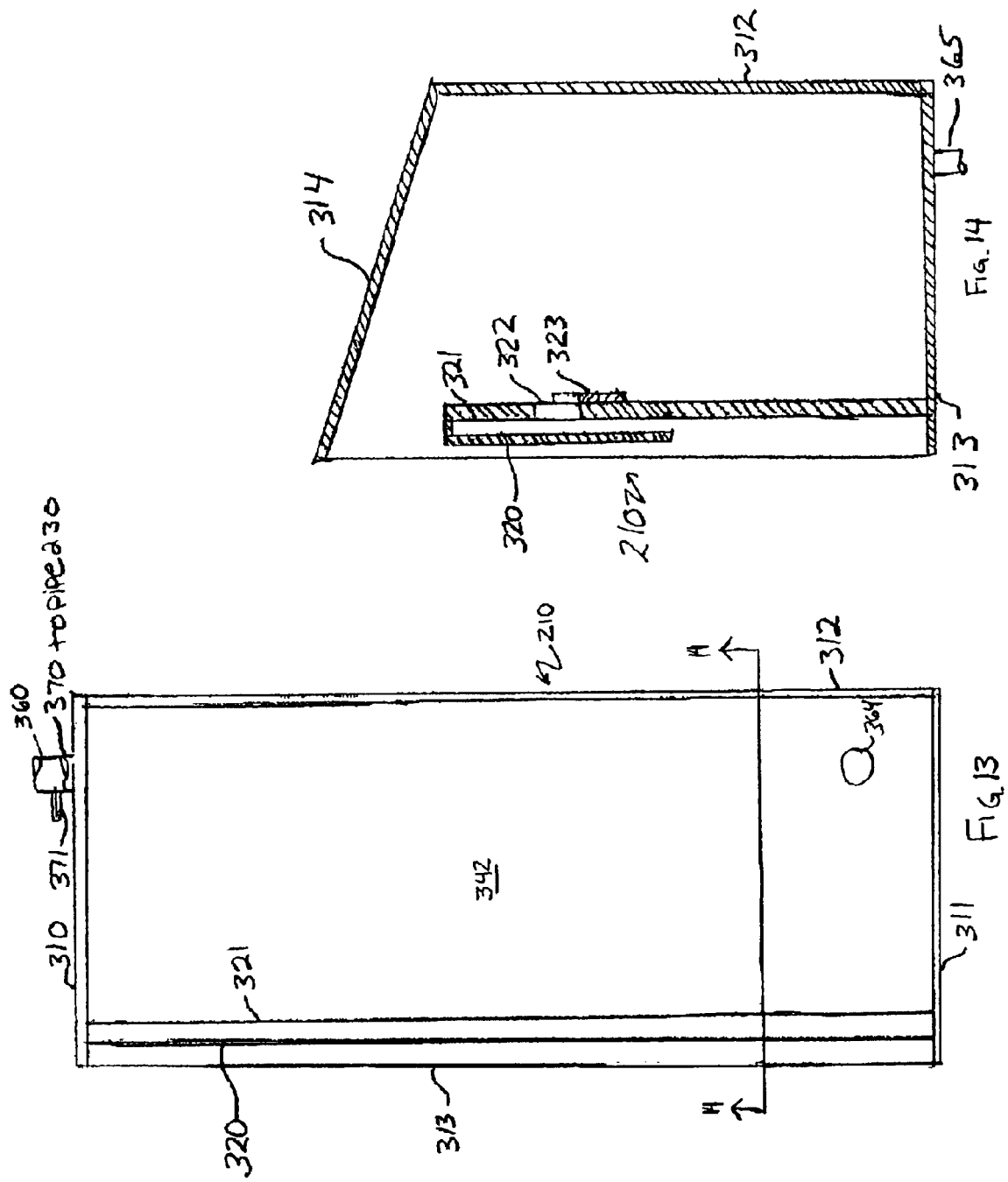

WASTEWATER TREATMENT SYSTEM

RELATED APPLICATIONS

This patent application claims prior and benefit under 35 U.S.C. 119(e) to patent application titled, "WASTEWATER TREATMENT SYSTEM" filed on Apr. 30, 2001, and assigned U.S. Provisional Application No. 60/287,305. U.S. Provisional Application No. 60/287,305 is hereby entirely incorporated by reference.

FIELD OF THE INVENTION

This invention relates to the treatment of wastewater and more particularly, but not by way of limitation, to systems and methods to remove contaminants from wastewater; to a system having a limited number of standard size and configuration elements and a system that is readily expandable.

BACKGROUND INFORMATION

The treatment of wastewater often involves the removal of particulate contaminants by such well-known technologies as clarification, dissolved air flotation (DAF), and induced air flotation (IAF). These technologies have been used in wastewater treatment systems for many years. Clarification is a gravity separation process wherein the wastewater is passed through a basin or tank and the suspended solids are permitted to settle to the bottom for collection and disposal. The clarification process assumes the suspended solids have a density greater than that of the wastewater being processed.

In dissolved air flotation (DAF), the wastewater or a portion thereof is saturated with air under pressure, for example at a pressure around 60 psig, and then introduced through a submerged inlet into an open treatment reservoir. At ambient pressure, the solubility of air in water is diminished, so that an excess of air is released from the wastewater in the form of very small bubbles. As the air bubbles move toward the surface of the wastewater, they contact and attach to particulate contaminants to form a particle-air aggregate having a lower density than the density of the particle alone. Since the vertical velocity is directly proportional to the difference between the density of water and the density of the particle, a decrease in the density of the particle (because it is now attached to air) results in an increase in the vertical velocity of the particle in water. Consequently, the particle aggregate moves toward the surface of the water more rapidly. The contaminant particles are skimmed from the surface of the wastewater to produce a treated or decontaminated wastewater containing a reducing amount of particulate contaminants.

In induced air flotation (IAF), air is induced into the wastewater by mechanical means. The induced air forms bubbles, which rise toward the surface of the wastewater. As the bubbles move upward, they contact and become attached to particulate contaminants to promote flotation of the contaminants, which are then skimmed from the surface. As in the DAF process, the bubbles function to increase the vertical velocity of the particulate contaminants in accordance with Stokes' law.

The treatment of wastewater also commonly involves chemical treatment of the wastewater to assist in removing pollutants or contaminants. Chemicals are often used for pH adjustment and for reaction with specific pollutants. Furthermore, certain treatment chemicals promote the formation of aggregates, of either suspended solids or oil and grease, which have larger diameters than the individual particulates. These aggregates settle out or rise to the surface more rapidly. According to Stokes' equation, the vertical velocity of a particle in water is directly proportional to the square of the particle's diameter; thus a two-fold increase of the particles diameter will produce a four-fold increase in the vertical velocity. For example, it is expected that a particular contaminant having a diameter of 2D will move either to the surface or to the bottom of a stream of water in about one fourth the time required for a particular contaminant otherwise identical having a diameter D. Accordingly, the use of such chemicals may be used advantageously in clarification and flotation processes to promote the aggregation of smaller particles into large particles, increase the separation velocities (either settling or rising), and thereby improve the separation rates and efficiencies. The result of the use of these chemical treatments with clarification and flotation processes is an effluent decontaminated wastewater having a reduced level of suspended solids and hydrocarbons. Many such chemical treatments are well known.

Wastewater treatment systems and methods incorporating such technologies are disclosed in my earlier patents:

(1) U.S. Pat. No. 5,173,184 issued Dec. 22, 1992
(2) U.S. Pat. No. 5,288,737 issued Feb. 22, 1994
(3) U.S. Pat. No. 5,423,981 issued Jun. 13, 1995
(4) U.S. Pat. No. 5,534,159 issued Jul. 9, 1996
(5) U.S. Pat. No. 5,755,973 issued May 26, 1998

FIG. 1 schematically illustrates a prior art wastewater treatment system based on the technology of the above patents and similar to those that have been manufactured by Hydro-Modular Systems Inc., of Oklahoma City, Okla. This system employs gravity separation and dissolved air flotation assisted by chemical treatment.

The system receives industrial wastewater from a plant and directs the dirty wastewater to a wastewater storage unit 100. The wastewater often contains suspended solids and hydrocarbons such as oil and grease. The storage unit 100 shown in FIG. 1 has conical pits that collect some of the suspended solids or oil and grease as sludge. The settled out sludge stays at the bottom of the wastewater storage unit 100. The pH of the wastewater is checked in the wastewater storage unit and is adjusted by addition of acid, for this particular wastewater, or caustic. The dirty wastewater is pumped by pump 101 from the storage unit 100 to an equalization tank 102. The equalization tank may help balance the amount of wastewater flowing through the system. It may operate to adjust the amount of flow out when the flow in is uneven. Chemicals are added in the equalization tank 102 to the wastewater to assist in the formation of larger particles or aggregates of the particulate matter that is suspected in the wastewater. A coagulant is supplied to the equalization tank from a drum 103 by a pump 151 and a coagulant aid is supplied from a drum 104 by pump 150. A mixer 105, attached to the top of the tank 102, mixes the chemicals with the dirty wastewater received from the wastewater storage unit 100.

The mixed dirty wastewater and coagulant chemicals are pumped by pump 106 from the equalization tank through mixing tubes 107 to a mixing, flotation, and discharge unit 108. A flocculent from a flocculent container 109 is added to the dirty wastewater and coagulant chemicals that pass through the mixing tube 107. Pressurized air is supplied from a source 110 and is injected into the dirty wastewater, coagulant, flocculent mix that is applied to the input of the unit 108. The wastewater treatment system is primarily a dissolved air flotation system. The dirty wastewater with chemicals and air enters the mixing area 111 of the unit 108.

Internal baffles near the input end of the unit 108 form the mixing area 111 of the unit where the dirty wastewater with chemicals and air is injected. The air present in the dirty water is in the form of large bubbles, which are reduced in size by recycled wastewater applied to a nozzle (not shown) inside the mixing area. This recycled wastewater flows through line 112 and is injected with air from a source 113 before being sprayed into the mixing area. Sometimes, the recycled wastewater from the output of unit 108 is applied to the inlet of the mixing area 111.

Baffles are placed in the output end 114 and form a central quiescent zone, which is the flotation area of the unit 108. The operation of the baffles is shown in FIG. 3 of U.S. Pat. No. 5,755,973 (the '973 patent). The internal construction of a typical mixing, flotation and discharge unit of the prior art is shown in FIG. 3 of the '973 patent. The baffles in the discharge zone determine the level of the wastewater that is processed in the unit.

The suspended particles that are more dense than the wastewater settle in the bottom of the unit in the cones 115, 116, and 117. The lighter particles that are less dense than the water float to the top in the quiescent zone with the movement of the less dense particles to the surface being assisted by the dissolved air in the wastewater. These floating particles typically create a foam or floc blanket on the top of the wastewater in the quiescent zone. A rake, as shown in FIG. 3 of the '973 patent, is employed to sweep or rake off this foam into a sludge receptacle 118 mounted on the side of the unit 108. The sludge goes to the bottom of receptacle 118 and cones 115–117 and is removed by being pumped from the cones and receptacle to a sludge storage tank 120.

A pump 121 is provided in the line between the unit 108 and the storage tank 120 to remove the sludge from the unit 108 for storage in tank 120. Sludge is removed from the wastewater storage tank 100 by a pump 122 and is pumped to the storage tank 120. The sludge in tank 120 is typically mixed with some material to help in the de-watering process and transported from the storage tank 120 to a press 123 by a pump 124. The sludge is de-watered in the press 123 and a cake is formed. The caked sludge is taken out of the press 123 for proper disposal.

One failing of the mixing, flotation, and discharge unit 108 is that it is custom made based on each customer's needs and specification. The unit 108 is often specifically designed and made to have a particular size that depends upon the volumetric flow and contamination of the dirty wastewater feeding the system. Consequently, the cost of providing the unit 108 is relatively high. The unit 108 may also be inflexible to changes in the volumetric flow, such as if the industrial plant expands and begins producing more wastewater, and a new custom designed and made unit 108 may need to be installed when the increased volumetric flow sufficiently degrades the performance of the existing unit. In a good case scenario the existing layout of the wastewater system will permit such an addition, otherwise more extensive and more costly system revamping may be needed.

BRIEF DESCRIPTION OF THE SEVERAL VIEWS OF THE DRAWINGS

The novel features believed characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

FIG. 4 shows a top plan view with the lid removed of an intake unit of a wastewater treatment apparatus, according to one embodiment of the present invention.

FIG. 5 shows a cross sectional view of an intake unit of a wastewater treatment apparatus, along the section lines 5—5 of FIG. 4, according to one embodiment of the present invention.

FIG. 6 shows a front elevation view of a GSAF unit, according to one embodiment of the present invention.

FIG. 7 shows a top plan view of a GSAF unit with the top removed, according to one embodiment of the present invention.

FIG. 8 shows a top plan view of a discharge unit with its lid removed, according to one embodiment of the present invention.

FIG. 9 shows a cross-sectional view of a discharge unit of a wastewater treatment apparatus, along the section lines 9—9 of FIG. 8, according to one embodiment of the present invention.

FIG. 13 shows a top plan view of a discharge unit without a filter, according to one embodiment of the present invention.

FIG. 14 shows a cross-sectional view of a discharge unit without a filter, along the section lines 14—14 of FIG. 8, according to one embodiment of the present invention.

DETAILED DESCRIPTION

Disclosed herein are new and useful wastewater treatment systems and methods that make significant changes and improvements to prior systems.

According to a first embodiment of the present invention, a wastewater treatment apparatus comprises modular or standardized components. The modular components or units may each be assembled from a limited number of panels having standard shapes, sizes, and configurations. This approach of employing a few panels of identical size and configuration, rather than custom designing each system with different sizes to fit the capacity needs of the customer, may allow the panels to be manufactured and inventoried and the system produced at a lower cost.

According to a second embodiment of the present invention the system comprises an expandable wastewater treatment apparatus for gravity separation and air flotation. The apparatus contains one or more units that may be separated in order to insert an additional unit to expand the capacity of the apparatus for decontamination. This unit may allow the decontamination capacity of a wastewater treatment system to be expanded with greater ease and at less cost than with prior units.

According to a third embodiment of the present invention, a wastewater treatment apparatus contains an improved flotation rake containing wheels for each gravity separation air flotation unit.

According to a fourth embodiment of the present invention, a wastewater treatment system contains a sludge tank having an improved hopper for material additions.

To aid in the understanding of the present invention, the following description provides specific details of presently preferred embodiments of the invention. It will be apparent, however, to one skilled in the art that the present invention may be practiced without some of these specific details, for example, by using multiple gravity separation air flotation units of a different design to form an expandable wastewater treatment apparatus, or by using standardized elements that have a different size or shape. Where the discussion refers to well-known structures and devices, block diagrams are used, in part to demonstrate the broad applicability of the present invention to a wide range of such structures and devices.

I. Wastewater Treatment Apparatus

Figure 2:
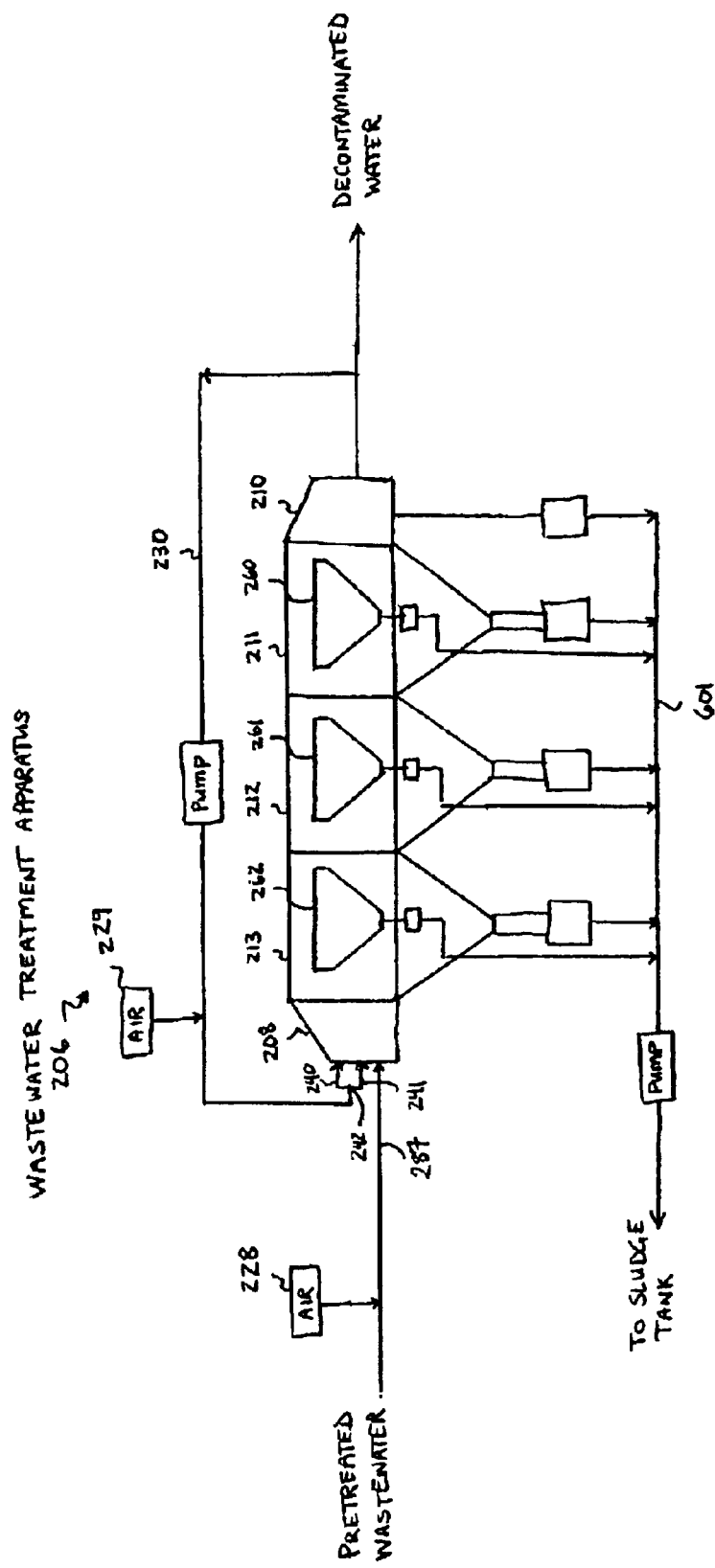
FIG. 2 shows a wastewater treatment apparatus, according to one embodiment of the present invention.

FIG. 2 shows a wastewater treatment apparatus 206, according to one embodiment of the present invention. The water treatment apparatus 206 includes at least an intake unit 208, one or more gravity separation/air flotation (GSAF) units, and a discharge unit 210. In the particular apparatus shown, there are three GSAF units 211, 212, and 213, although this is not required and the apparatus could include fewer or more of these units.

Figure 1:
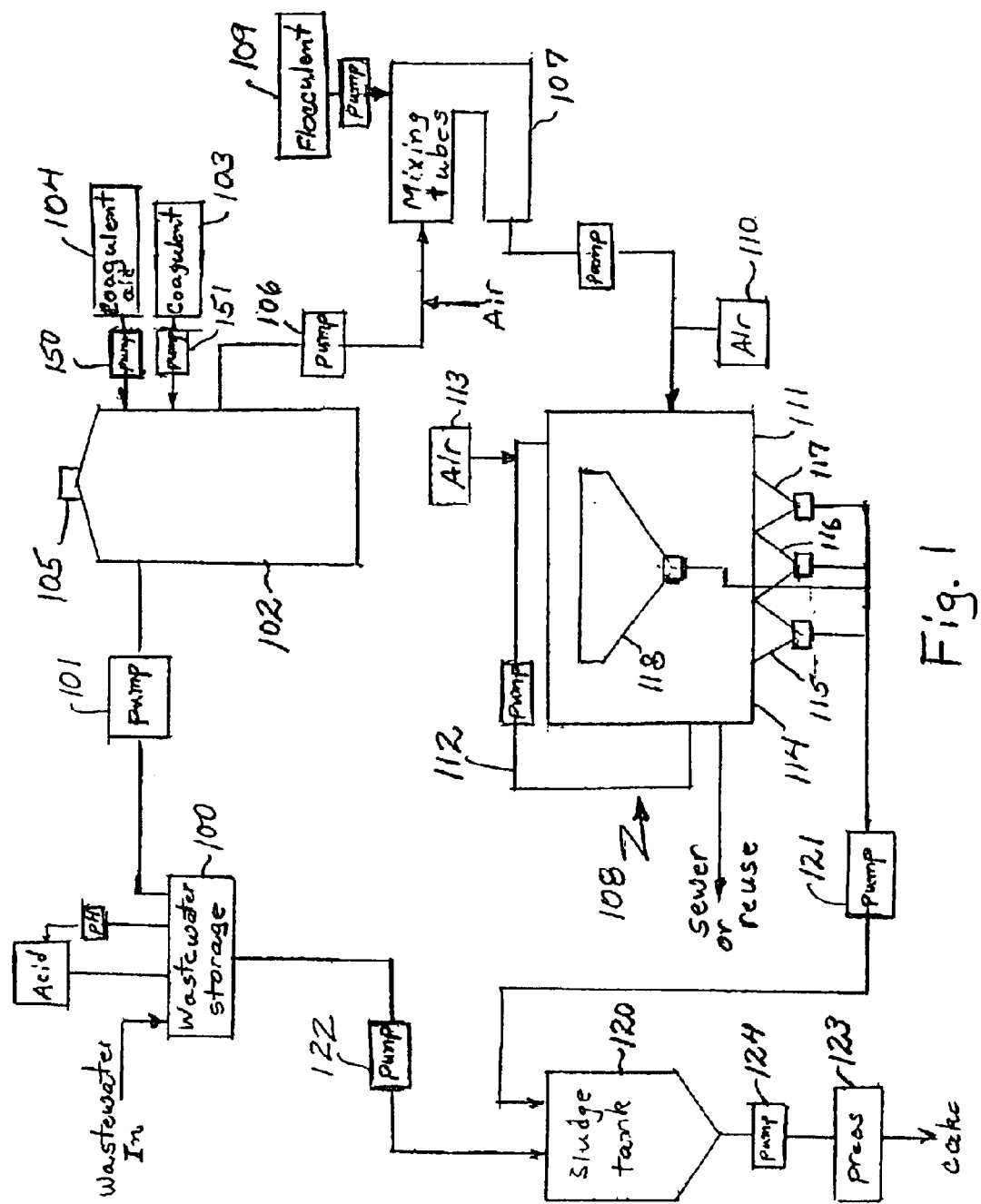
FIG. 1 shows a prior art wastewater system.

Pretreated wastewater containing such chemicals as pH adjustment chemicals, coagulant chemicals, and flocculant chemicals enters through the inlet unit 208. The wastewater may come from a variety of wastewater producers or facilities, such as but not limited to manufacturing, food processing, mining, industrial laundering, and other facilities. Any wastewater containing solids, particulates, oil droplets, or like contaminants, is suitable. The pretreated wastewater may be similar to the wastewater fed to the unit 108 shown in FIG. 1 or similar to the effluent pretreated wastewater from the treatment system 280 shown in FIG. 3, although this is not a limitation of the present invention, and it will be appreciated by a person skilled in the art of wastewater treatment that the apparatus 206 is suitable for processing a variety of differently treated wastewaters, as well as untreated wastewaters. Pressurized air is added from a source 228. The air may be added inline, as shown, or may be added to the intake unit directly.

The present inventor has discovered that it is often desirable to avoid very turbulent or highly mixed flow, after the addition of coagulants and flocculants, since such flow may disassemble aggregates that have formed. One way of avoiding such disruptive shearing flow is to use a conduit 287 having sufficient cross section to convey the wastewater from the tank or other vessel, where the flocculants and coagulants are added, into the intake unit 208 at a slow flow that avoids disassembling the aggregates to any significant extent. The conduit 287 may have a sufficient size to provide a slow flow of the wastewater that helps avoid disassembling of the particle aggregates. The conduit 287 may have a rectangular cross section with a longest length that runs at least a substantial proportion of the length of the intake unit. Longer lengths may be desired inasmuch as they may help a floc blanket, if and when it forms in the intake unit, to form uniformly in the unit rather than be bunched up against one end. A conduit having a cross sectional area of around 1 square foot is able to slow the flow to a significant extent, although the inventor has found that even larger cross sections up to about 7 square feet, or more, may be useful for a wastewater flow rate of about 100 gallons per minute. One exemplary conduit has a rectangular cross section with a length along almost all of a 7-foot long GSAF unit and a height of about 1-foot.

Although not required, a portion of water decontaminated by the apparatus 206 may be recycled through a line 230, aerated with pressurized air from a source 229, and added to the intake unit 208. Depending upon the particular pretreatment wastewater flows, the levels of contaminants in the wastewater, and the performance of the system, a volume up to about 50% of the pretreatment wastewater flow may be recycled. This recycle flow may be added to the intake unit 208 and used to help aerate the pretreated wastewater fed to the apparatus 206. In one instance, the recycle flow may be added to the intake unit 208 though a split input manifold. A tee 242 may be used to split the flow in the line 230 into two proportions that flow respectively into the split input manifold and into the intake unit 208 through inlet lines 240 and 241. An exemplary split input manifold is illustrated in FIGS. 4–5 and will be discussed further below. The split input manifold may help to distribute the aerated recycle water and the bubbles contained therein over a greater proportion of the intake unit, promote mixing and aeration, avoid buildup of a floc blanket at one end of the intake unit, and otherwise improve the efficiency of the intake unit.

Of course, the invention is not limited by the way the wastewater and any desired recycle are added to the input unit and other ways are contemplated. For example, they may be added separately through pipes, with or without distributors, or they may be combined and added through a split input manifold. The wastewater may also be aerated in an aeration chamber having sufficient volume and a number of baffles to mix the wastewater with recycled aerated water and air, although the inventor has found that the mixing in this baffle may break and disassemble aggregates compared to adding the wastewater through a conduit.

The aerated wastewater flows from the intake unit into the GSAF unit 213 and then flows to the GSAF units 212, and 211 in succession by gravity flow. Particulate contaminants that enter each of the gravity separation air flotation units may be removed by either gravity separation or air flotation. The GSAF units each allow larger solids to separate to the bottom of the units due to gravity and allow smaller floatable solids to concurrently float to the top of the units and form a removable froth or floc blanket.

Lighter particles that enter the units tend to rise and form a floc blanket that floats on the surface of the wastewater in each of the units. The floc blanket may be removed into sludge bins 260, 261 and 262 mounted on the side of each unit. As the floc blanket is formed on the top of the wastewater flowing through the wastewater treatment apparatus 206 one or more rakes may be turned on to rake or skim the floc blanket from the surface of the wastewater and deliver the floc blanket into sludge bins 260, 261 and 262 mounted on the side of each unit. The rakes may move across the top surface of the wastewater in the units, skimming the floc blanket in the direction of their movement, and remove the floc blanket from the units through an opening, located on the same side of the units as the bins 260, 261, and 262, and positioned so that the bottom of the opening is slightly above the bottom of the floc blanket and the top of the wastewater level controlled in the units. The rakes may be left on for a selected period of time until the floc blanket has been removed and then shut off to permit the formation of a new floc blanket. The rakes may also be operated continuously, although maintaining a certain level of floc blanket in the units may help accumulate floatable particulate contaminants.

Heavier particles of contaminants are removed from the wastewater by gravity separation and fall to the conical bottoms of each GSAF unit. The sludge from the conical bottoms and sludge bins of each of the GSAF units may be transported or pumped intermittently to a sludge tank through sludge discharge pipe 601. As desired, the discharge of sludge from the sludge bin hopper and the bottom conical sections of the unit may be automated by automatic actuation of solenoid valves and an air diaphragm or other sludge pump to convey the sludge to a sludge tank or other repository. Often the first GSAF unit 213 nearest the intake unit 208 will collect more sludge by both air flotation and gravity separation than the other units. Consequently, more sludge may need to be removed from this unit than from the other units. The sludge removed from the sludge bins and conical bottoms contains particulate contaminants that are removed from the wastewater passing through the apparatus 206.

Decontaminated water, containing less particulate contaminants than the pretreated water fed to the wastewater treatment apparatus 206, flows from the unit 211 to the discharge unit 210 and is subsequently discharged from the apparatus 206. Depending upon the particular needs of the wastewater treatment system in which the apparatus is employed, the decontaminated water may be discharged to a sewer, discharged to a reuse tank for later reuse, or further decontaminated. In any event, the wastewater treatment apparatus may be used to great benefit to reduce the level of particulate contaminants in an industrial wastewater and may help place the wastewater in greater compliance for public disposal or reuse.

As desired, a portion of the decontaminated water may be pumped through line 230, aerated with pressurized air from a source 229, and added to the intake unit 208. Depending upon the particular pretreated wastewater flows, the levels of contaminants in the wastewater, and the performance of the system, a volume up to about 50% of the pretreated wastewater flow may be recycled.

II. Exemplary Pretreatment System

Figure 3:
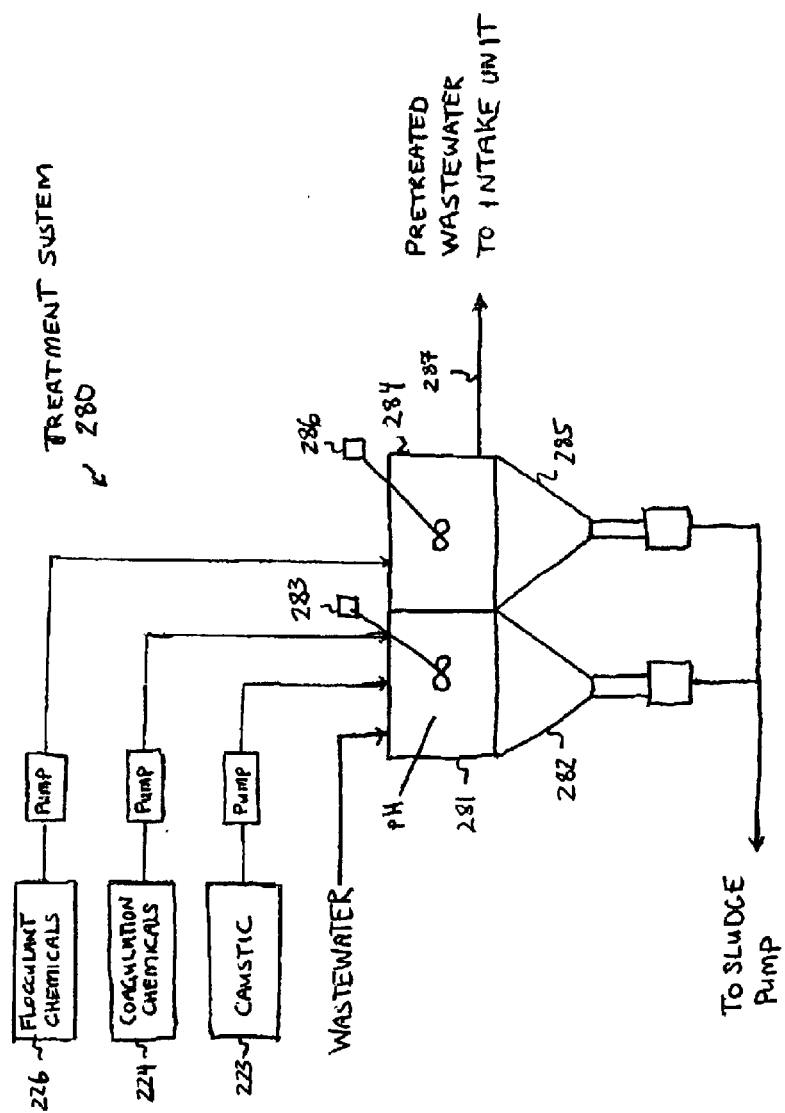
FIG. 3 shows an exemplary chemical treatment system for pretreating a wastewater, according to one embodiment of the present invention.

FIG. 3 shows an exemplary chemical treatment system 280 for pretreating a wastewater prior to gravity separation air flotation, according to one embodiment of the present invention. The system receives wastewater from an industrial facility or other wastewater generator. Depending upon the particular facility, the wastewater may be obtained from a wastewater storage unit, a settling tank, an equalization tank, or directly from the facility. The received wastewater is added to a coagulation tank 283. The pH of the wastewater in the coagulation tank is sensed, for example by a pH meter, and adjusted by addition of pH adjustment chemicals. In the particular illustration the pH is adjusted through addition of a caustic base from a caustic container 223 by a pump, although in other embodiments the pH may be adjusted by addition of an acid. Coagulation chemicals, such as a coagulant aid and a coagulant, are added from one or more containers 224 by a pump. Simple beaker experiments may be performed to determine suitable levels of chemicals to add for a particular wastewater. The chemicals may help particles in the wastewater assemble as aggregates such as pin floc. The tank 281 contains a mixer 283 for mixing the chemicals with the wastewater in the tank. The mixer is often operated at a mixing rate that is sufficient to mix the chemicals while avoiding an unnecessarily high mixing rate that may disassemble aggregates.

Wastewater flows from the coagulation tank 281 to a flocculation tank 284. The coagulation tank may be attached to the flocculation tank and contain a weir located between the tanks to allow wastewater to flow from the coagulation tank into the flocculation tank. The weir may allow wastewater to flow between the tanks without the introduction of shearing forces such as those introduced by pumps that could disassemble particle aggregates formed in the coagulation tank. Of course a pump may be used to transfer the wastewater, as desired. Flocculent chemicals are added from a container 226 to the flocculation tank 284 by a pump. A mixer 286 is used to mix the flocculant chemicals with the wastewater in the tank 284 and may be operated at a suitably low mixing rate to avoid disassembling aggregates.

Both the coagulation tank 281 and the flocculation tank 284 contain conical bottoms to collect gravity separated solids. Some of the heavier particles and aggregates in the tanks 281 and 284 may collect in the conical bottoms and may be removed intermittently to the sludge tank by a pump.

Pretreated wastewater is discharged from the flocculation tank 286 to the intake unit 208 through a conduit 287. Although the conduit 287 is not required, it may provide an even gradual flow for the wastewater that avoids breaking up aggregates.

Numerous other pretreatment systems are suitable for the present invention. In one alternate system one of the tanks is avoided, in order to obtain a lower cost system, by adding the chemicals to a single tank. In another alternate system, both tanks 281 and 284 may be avoided by adding pH adjustment chemicals to a wastewater storage pit, settling tank, manhole, or equalization tank and adding coagulation and flocculation chemicals to these tanks, inline before the intake unit, within the intake unit, or elsewhere.

III. Intake Unit

FIGS. 4 and 5 show an intake unit of a wastewater treatment apparatus, according to one embodiment of the present invention. In particular, FIG. 4 shows a top plan view of the intake unit with the cover or lid removed and FIG. 5 shows a cross-sectional view along the section lines 5 of FIG. 4.

The intake unit illustrated contains an opening 288 to allow entry of pretreated wastewater, having chemicals and dissolved air, into the intake unit from a conduit 287. As previously discussed, the conduit 287 may be desired in order to provide a slow flow of pretreated wastewater into the intake unit to avoid breaking apart aggregates. The particular opening illustrated is a rectangular opening that spans the length of the intake unit and a suitable height to slow the flow of wastewater through the intake unit. The opening is desirably positioned in the lower half of the input unit to encourage good mixing of wastewater with aerated recycle water and to avoid slip over the baffle 250 without good mixing.

The internal elements of the intake unit include a split input manifold and baffles 250, 251, and 252. The recycle water in the line 230 is split into two proportions by a tee 242 external to the intake unit so that the flow in the line 230 is divided into input lines 240 and 241, as shown in FIG. 2. The intake unit 208 has three ports 270, 271 and 272, two of which are used as input ports. The top port 270 is blocked off. The intake unit contains an input that is split into two parts with a first manifold covering approximately one-half of the width of the intake unit and a second manifold covering the balance of the width of the intake unit. An input manifold 243 is coupled to one input port and an input manifold 244 is coupled to the other input port. Line 240 feeds a manifold 244 inside the intake unit 208. Line 241 supplies a second manifold 243 that is positioned below manifold 244 inside the intake unit 208. The second manifold 244 has openings on one side of the intake unit 208 while manifold 243 has openings on the other side of the intake unit 208, as shown in FIG. 4. The openings in the manifolds 244 and 243 cover the entire width of the intake unit 208 as shown in FIG. 4.

The use of two manifolds to cover the two halves of the intake unit 208 is different from what has been done in the past. The inventor has found that in prior intake units that used a single pipe to distribute aerated wastewater into the intake unit a majority of wastewater and air exited early in the pipe and did not make efficient use of the entire length and volume of the intake unit. This made the intake unit operate at reduced efficiency. There was also a tendency for a floc blanket to form at one end of the intake unit. The floc blanket took up space in the unit and may have caused added turbulence. Actual test runs by the inventor seem to indicate that better distribution of an aerated water, such as the aerated recycle water, may be obtained over the length and full volume of the intake unit by feeding the water to the intake unit through a split input manifold having two separate pipes. The split input manifold may cause the water to be dispersed more evenly over the length and volume of the intake unit which helps to promote mixing of the dirty wastewater with the aerated recycle water, reduce stagnant zones, reduce accumulation of the floc blanket on one end, and improve the overall efficiency of mixing and aeration in the intake unit.

The two manifolds 243 and 244 are shown with the outlet holes facing upward. However, in actual use the outlet holes may often be turned downward and off the vertical by about 45 degrees. In this way, good mixing of the dirty wastewater, recycle, dissolved air, and chemicals takes place in intake unit 208. If the wastewater flows through the intake unit 208 too rapidly, a boiling effect may take place and generate large air bubbles that are not as useful as smaller air bubbles with a higher concentration of air. The slowing down of the flow of the wastewater through the intake unit 208 promotes the creation or formation of a floc blanket in the follow-on GSAF units.

The intake unit 208 further includes three baffles 250, 251, and 252, that assist in the mixing of the flocculent and wastewater that is input to the intake unit 208 and also in separating the heavy particles and light particles in the dirty wastewater. The intake unit 208 is closed on three sides by housing elements or panels 253, 254 and 255. The intake unit has a bottom panel 256. The panels of the intake unit may be attached to a gravity separation air flotation unit as shown in FIG. 2 and in other drawings. Baffle 250 is supported by the side panels 253 and 255 and touches the bottom 256 so that the wastewater with flocculent and dissolved air and chemicals passes over the top of the baffle 250, as shown in FIG. 5. Baffle 251 is attached to the side panels 253 and 255 and is mounted above the bottom panel 256 so that the dirty wastewater flows under this panel as shown in FIG. 5. Baffle 252 is supported by the side panels 253 and 255 and is near the bottom 256 so that the dirty wastewater passes over the top of this baffle 252 as shown in FIG. 5.

The intake unit 208 is different from previous intake units in the addition of the first baffle 250. The baffles slow down the flow of the water in the intake unit 208 and in the balance of the wastewater treatment apparatus 206. The addition of the baffle 250 slows down the flow of the wastewater through the intake unit more than was accomplished in the earlier mixing units of the prior art.

In one particular intake unit of the present invention, which will be referred to as a "large unit" which depending upon the particular wastewater and contaminants is often able to process between about 50–100 gallons per minute of wastewater, the unit 208 may have a depth of three feet, a width of seven feet, a height of the front part of four feet, a height of the back part of five feet, and a top cover with a width of 7 feet and a depth of approximately 3.16 feet. The conduit opening 288 may have a length of about 7 feet and a height of about 1 foot. The first baffle 250 may have a width of seven feet and a height of about 35 inches. The middle baffle 251 may have a width of seven feet and a height of about 35 inches and may be raised off the floor 256 by approximately 11 inches. The final baffle 252 may have a width of seven feet and a height of about 17 inches and may be raised off floor 256 by about one inch. This separation of the baffle 252 from the floor 256 may provide a path for cleaning the intake unit 208 by washing out the unit. The manifolds 243 and 244 may have an outside diameter of three inches with manifold 243 extending across the entire width of seven feet of the intake unit 208, and manifold 244 extending approximately 3½ feet into the intake unit 208. A three inch outside diameter pipe should be sufficient to deliver flows up to around 200 gallons per minute, although smaller pipes may be used for smaller flows to help save cost, as desired. The manifold 243 may lack discharge holes in the first one-half of its length. The plurality of discharge holes in the manifolds 243 and 244 may be provided in sufficient number to permit the flow of fluids therethrough that are equivalent to the flow in the three-inch pipe that comes into the manifolds 243 and 244. In one example about 30–50 discharge holes, each having a diameter of about ⅜-inch, are provided on each of the manifolds 243 and 244, although this is not required.

IV. Gravity Separation Air Flotation Unit

FIGS. 6 and 7 show a gravity separation air flotation unit, according to one embodiment of the present invention. In particular, FIG. 6 shows a front elevation view of the GSAF unit and FIG. 7 shows a top plan view of the GSAF unit with the top removed.

The unit has a front panel 810 and a back panel 811. These panels may either meet with panels of an adjacent GSAF unit or with panels of an intake unit or a discharge unit. The GSAF unit has a cone at the bottom formed from four panels 814, 815, 816 and 817. The panels 814, 815, 816 and 817 form a truncated cone 820, which terminates in a plate 821. The present inventor has found that a cone with an angle of around 45-degrees is often convenient for removing solid particles to the bottom of the cone, although this is not required. A discharge port 823 is in the middle of the plate 821 at the bottom of the cone 820. A pipe 824 is connected to the discharge port 823 for removal of the sludge collected at the bottom of the GSAF unit in the truncated cone thereof. The discharge of the sludge from a GSAF unit may be controlled by a solenoid valve 830 in the pipeline 824 that may connect with the sludge removal pipe 601 of FIG. 2.

A floc blanket sludge bin or hopper 850 is attached to the front of the GSAF unit. The hopper 850 is shown in dotted lines in FIG. 6 and at the front of the GSAF unit in FIG. 7. The front panel 810 has an opening 860 for removal of the sludge that floats on the top of the wastewater as it passes through the wastewater treatment apparatus 206. A rake is often used to skim the floc blanket from the surface of the wastewater through the opening. The hopper 850 covers the opening 860 in the front wall of the unit. The hopper 850 has a conical shape and collects sludge removed from the unit through the opening in its bottom. A port 840 at the bottom of the hopper 850 is coupled to a pipe 841 for carrying the sludge from the front hoppers 850 to the sludge tank through the pipe 601, as shown in FIG. 2. A solenoid valve 842 is in the path of the pipe 841 and the solenoid valve 842 is electrically operated to open a passage from the hopper 850 through the pipe 841 to the sludge tank.

V. Discharge Unit And Weir

A. Filter in Discharge Unit

FIGS. 8 and 9 show a discharge unit, according to one embodiment of the present invention. In particular, FIG. 8 shows a top plan view of a discharge unit with its lid removed and FIG. 9 shows a cross-sectional view of the unit along the section lines 9 of FIG. 8.

The discharge unit 210 has a housing made up of side panels 310 and 311, front panel 312, bottom panel 313, and is closed on top by a lid 314. The lid 314 is also shown in FIG. 9. The discharge unit 210 has a first baffle 320 that is supported by a panel 321. In the large unit, the opening 322 in panel 321 may be approximately 34½ inches above the floor 313 of the discharge unit 210. The wastewater, with dissolved air and chemicals, flows through the wastewater treatment apparatus 206 slightly above this level and spills over the bottom of the opening 322. The weir 323 is often at or below the bottom of the opening of 322.

Figure 10:
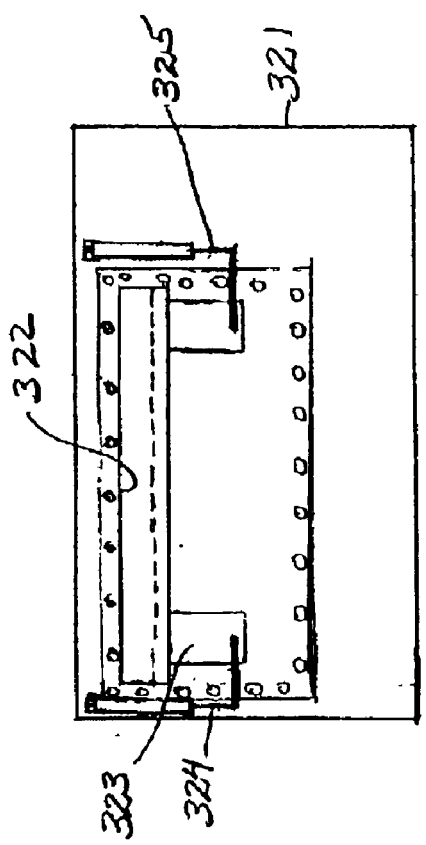
FIG. 10 shows a front elevation view of a discharge unit baffle employed in a discharge unit, according to one embodiment of the present invention.

Next, inside the discharge unit is the discharge control panel 321. This panel 321, as seen in FIG. 10, has an opening 322 extending along the width of the panel with a weir 323 in front of the opening 322 to control the size or height of the opening. The panel 321 with weir is shown in a front elevation view in FIG. 10. The weir 323 is movable by rods 324 and 325 under the action of a pneumatic source, which pulls the rods 324 and 325 up and down along with the weir 323. Level controls may be useful to automatically adjust the weir to achieve a desired water capacity.

Figure 11:
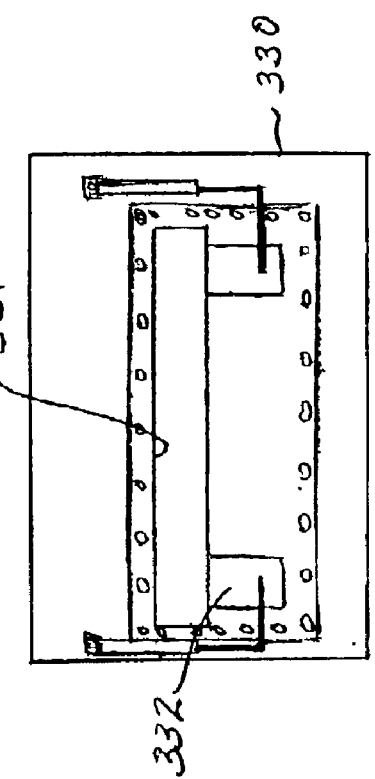
FIG. 11 shows a front elevation view of a filter discharge baffle located in a discharge unit, according to one embodiment of the present invention.

The next element inside the discharge unit is a filter discharge panel 330, which is shown in front elevation view in FIG. 11. Panel 330 has an opening 331 at an elevation below the elevation of the opening 322 in panel 321. Panel 330 is supported by the end 311 and the bottom 313 of the discharge unit 210. The panel 330 is also supported at the end near end panel 310 by a panel 340 that extends from the front panel 312 to the panel 321 and forms a reservoir 341 at one end of the discharge unit 210. The panel 340 extends down to the floor 313 but does not extend all the way to the top of the discharge unit 210. The height of the panel 340 relative to the opening 331 in panel 330 is shown in FIG. 9. The treated wastewater that appears in the discharge unit 210 either flows over baffle 340 into reservoir 341 or through the opening 331 in baffle 330 to be further treated by the filter in the filter area 342. A filter chamber or reservoir 342 is formed by panels 330 and 340 in cooperation with the front panel 312.

Figure 12:
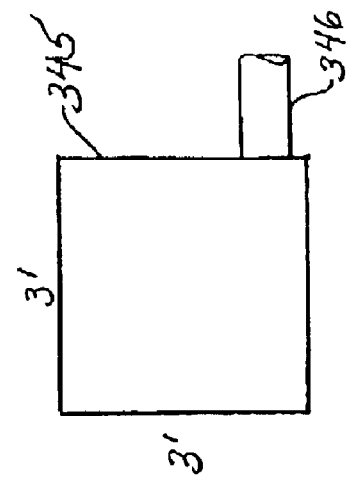
FIG. 12 shows a front elevation view of a filter discharge baffle located in a discharge unit, according to one embodiment of the present invention.

Filtration involves separating solid particles from a liquid by passing the liquid through a porous medium. The reservoir 342 is a filter area where a filter 345 may be located to further clean the wastewater of the system. A front elevation of filter 345 is shown in FIG. 12. One type of filter that is contemplated includes a diatomaceous earth filter. The diatomaceous earth filter may be desirable for such service because it can be easily and automatically back-flushed based on a buildup of pressure. This may avoid the need to clean or change affixed filters such as screens. Rather than diatomaceous earth, other porous substances such as sand, peat, or activated carbon may also be used. Alternatively, the diatomaceous earth filter could be replaced by another type of filter, such as a membrane filter or fabric filter.

This filter 345 has a steel flame with a backing around the front and back and top and bottom. A stainless steel cloth is wrapped around the filter 345 and is supported by this backing. Diatomaceous earth is put in the reservoir 342 and cakes on the cloth wrapped around the filter 345 when a pump is turned on to pull the water out of the discharge unit 210. The filter 345 is coupled by a pipe 346 to an outlet port 393 that is the middle of three vertically positioned ports in the end panel 310. The pipe 346 is coupled through this port 393 to a pipe 350 that carries the clean water from the water treatment apparatus.

If and when the filter gets too dirty and will not permit any further flow of water or reduces the water flow significantly to the point where the water backs up into the chamber created by panels 321, 330, end panel 311 and panel 340, there will be an increased flow of water over the top of panel 340 into the reservoir 341. A vacuum sensor 371 is located in the pipe 350 on the suction side of the pump that pulls water from the filter 345. This sensor 371 is employed to sense the pressure present in the line 350, which is an indication of the condition of the diatomaceous earth filter 345. As the filter 345 gets dirty, the vacuum at 371 will increase. When it reaches the point of six inches of mercury, a control switch (not shown) that is responsive to the output of the sensor 371 shuts off the pump and closes the opening 331 by raising the weir 332. Once the opening 331 is closed, all of the water flowing into the discharge unit 210 will flow over the baffle 340 and into the reservoir area 341.

During this time, water is forced into the filter 345 through an inlet port 363. This water causes the diatomaceous earth to break away from the surface of the filter 345. Then a pump connected to a pipe 365, which is connected to the outlet port 364, is turned on to remove the diatomaceous earth and any other material from the filter reservoir 342. In this way, the diatomaceous earth filter 345 is back-washed and is ready for application of new diatomaceous earth for further functioning as a filter.

Two outlet ports 391, 392 are coupled to the reservoir 341, and one is connected to a pipe that carries discharge water to the city sewer. The top part 391 is connected to a pipe 370, which carries treated water through a return line 230, shown in FIG. 2. The return line 230 carries the treated water and is aerated and returned to the intake unit to increase the concentration of dissolved air and improve separation.

According to one embodiment of the present invention, the housing of the discharge unit 210 has the same dimensions as the housing for the input unit 208. In particular, for the large unit the width of the housing is seven feet, the height in front is four feet, the height in back is five feet and the depth is three feet. The discharge control panel or baffle 321 has a height of four feet and a width of seven feet. The opening 322 is 56 inches long and four inches high. The weir 323 is 58 inches long and four inches high. The bottom of the opening 322 is 34½ inches from the floor 313 of the discharge unit 210. The baffle 320 extends from the top of baffle 321 and extends down approximately two feet so that the tip is below the bottom of the opening 322 to help prevent floc blanket or froth on the top of the water in the preceding GSAF unit from flowing through the opening 322. The filter control baffle 331 is also four feet tall. It is shorter than panel 321. The length of baffle 331 is six feet. The opening 331 is approximately 22 inches from the bottom 313 of the discharge unit 210. The opening has a height of four inches so that the top of the opening is 26 inches from the bottom. The baffle 327 extends down from the top of baffle 331 and extends down approximately 2½ feet and has the same length as the baffle 331 of approximately six feet. The diatomaceous earth filter has a width and height of three feet each and a depth of approximately four inches. Initial tests indicate that the filter may be able to filter around 20 gallons per minute of wastewater, or more.

B. Discharge Unit Without Filter

It is not necessary that a filter be included in the discharge unit. A customer may desire to omit a filter unit from the discharge unit if the quality of the decontaminated wastewater leaving the last GSAF unit is sufficient. Omitting the filter in the discharge unit may also be desired in order to avoid any need to shut down the wastewater treatment apparatus that includes the discharge unit in order to service or flush diatomaceous earth from the filter unit.

FIGS. 13–14 show a simplified discharge unit in which a filter is not included, according to one embodiment of the present invention. In particular, FIG. 13 shows a top plan view of a discharge unit with its lid removed and FIG. 14 shows a cross-sectional view of the unit along the section lines 14 of FIG. 13.

The external housing, the panel 321, the first baffle 320, the opening 322, and the weir 323 may be as previously described for the discharge unit shown in FIGS. 8–9. The filter discharge panel 330, the baffle 327, the opening 331, the weir 332 and the panel 340 may be removed. The treated water that appears in the discharge unit 210 flows through the opening 322 in the baffle 321 under the control of the weir 323 and into a reservoir 342. The water may leave the reservoir 342 and the discharge unit through an outlet port 364. Two outlet ports 391, 392 are coupled to the reservoir 341, and one is connected to a pipe that carries discharge water to the city sewer. The top port 391 is connected to a pipe 370, which carries treated water through a return line 230, shown in FIG. 2. The return line 230 goes to the aeration chamber 204 and carries the treated water that still has some dissolved air to increase the concentration of dissolved air at the input end of the wastewater treatment apparatus.

VI. Standard Size and Configuration Components

According to one embodiment of the present invention, the wastewater treatment apparatus 206 and other portions of a wastewater treatment system may be made up of modular and standardized components or units. The components or units may have standard constructions, sizes, and configurations for assembly that are compatible with other components in the system and may be connected together with these other components. The modular units may each be formed or assembled from a limited number of interconnected housing construction elements or flat panels and internal elements such as baffles that have standard sizes, shapes, and assembly configurations. The panels for the modular components may be mass produced in a factory at relatively low cost and then assembled at a wastewater treatment site. This expandable cookie cutter design approach, employing a few panels of identical size and configuration, rather than custom designing the sizes and configurations of each system to fit the capacity needs of the customer, may allow the panels to be manufactured, inventoried, and the components and systems produced at a lower cost. This allows the potential for high quality, precisely constructed, wastewater treatment apparatus based on simple assembly at the site. As a result, affordable wastewater treatment apparatus may be provided.

Figure 15:
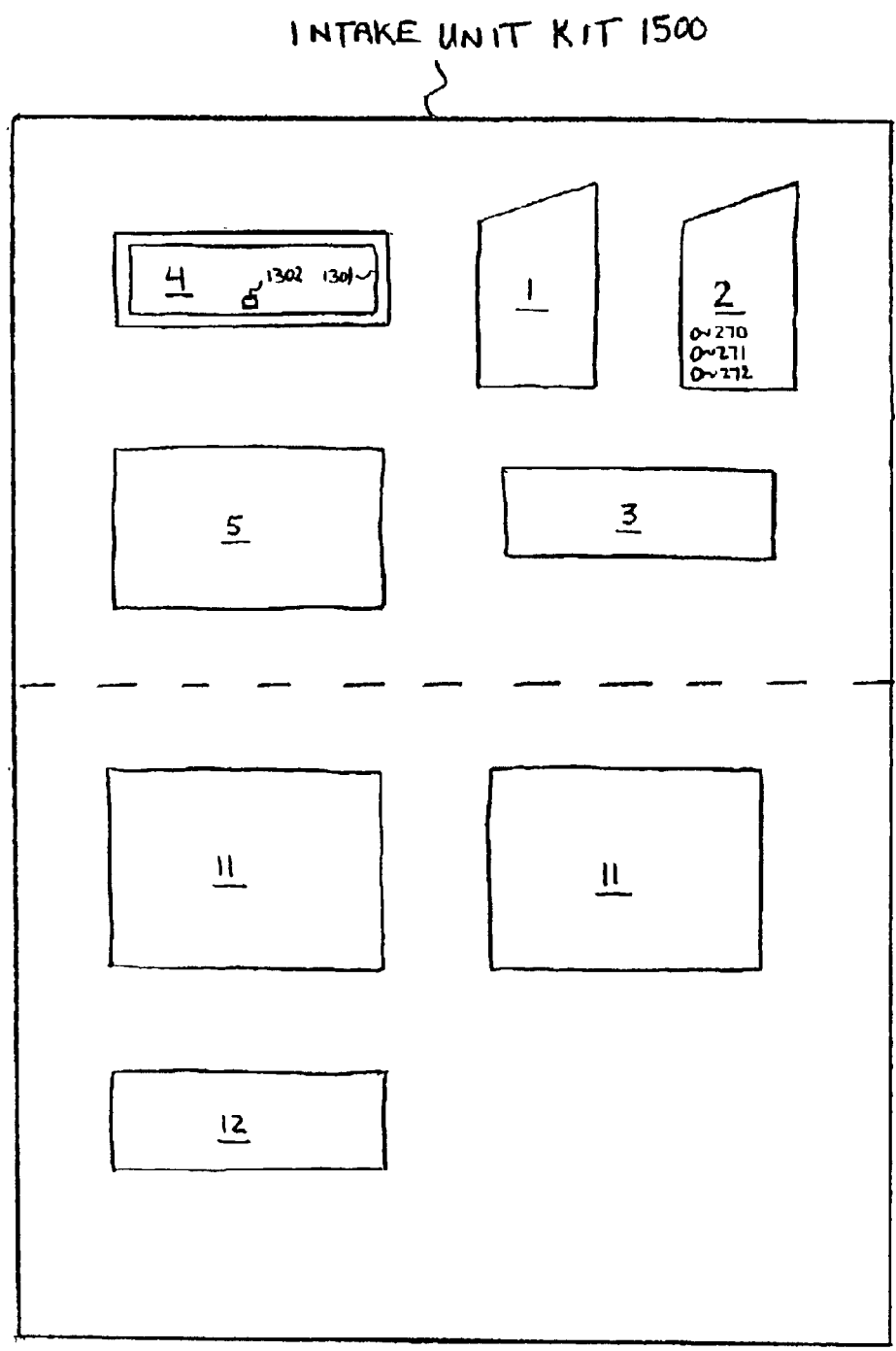
FIG. 15 shows a group or kit of standardized panels that may be used to make up an intake unit, according to one embodiment of the present invention.
Figure 16:
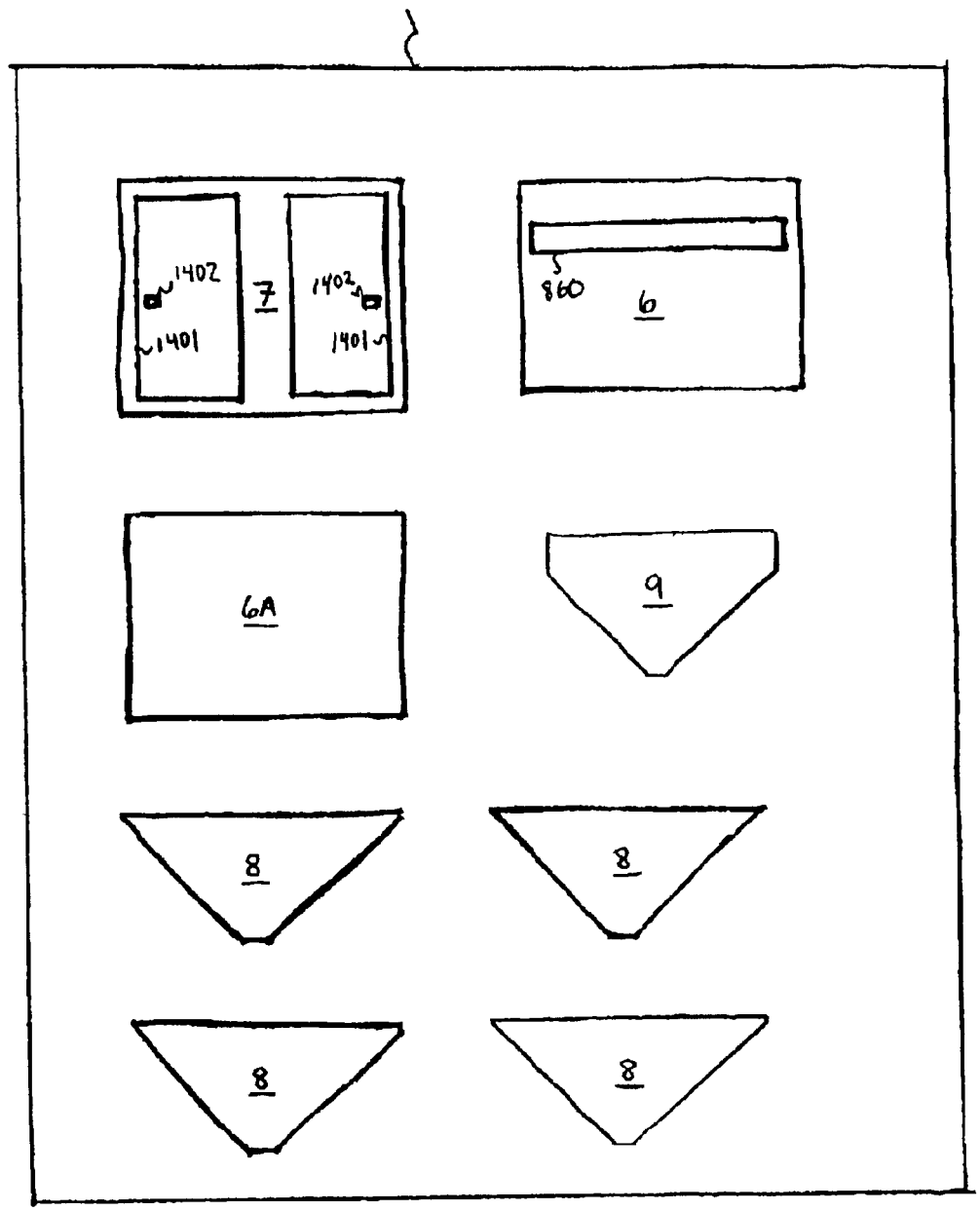
FIG. 16 shows a group or kit of standardized panels that may be used to make up a GSAF unit, according to one embodiment of the present invention.
Figure 17:
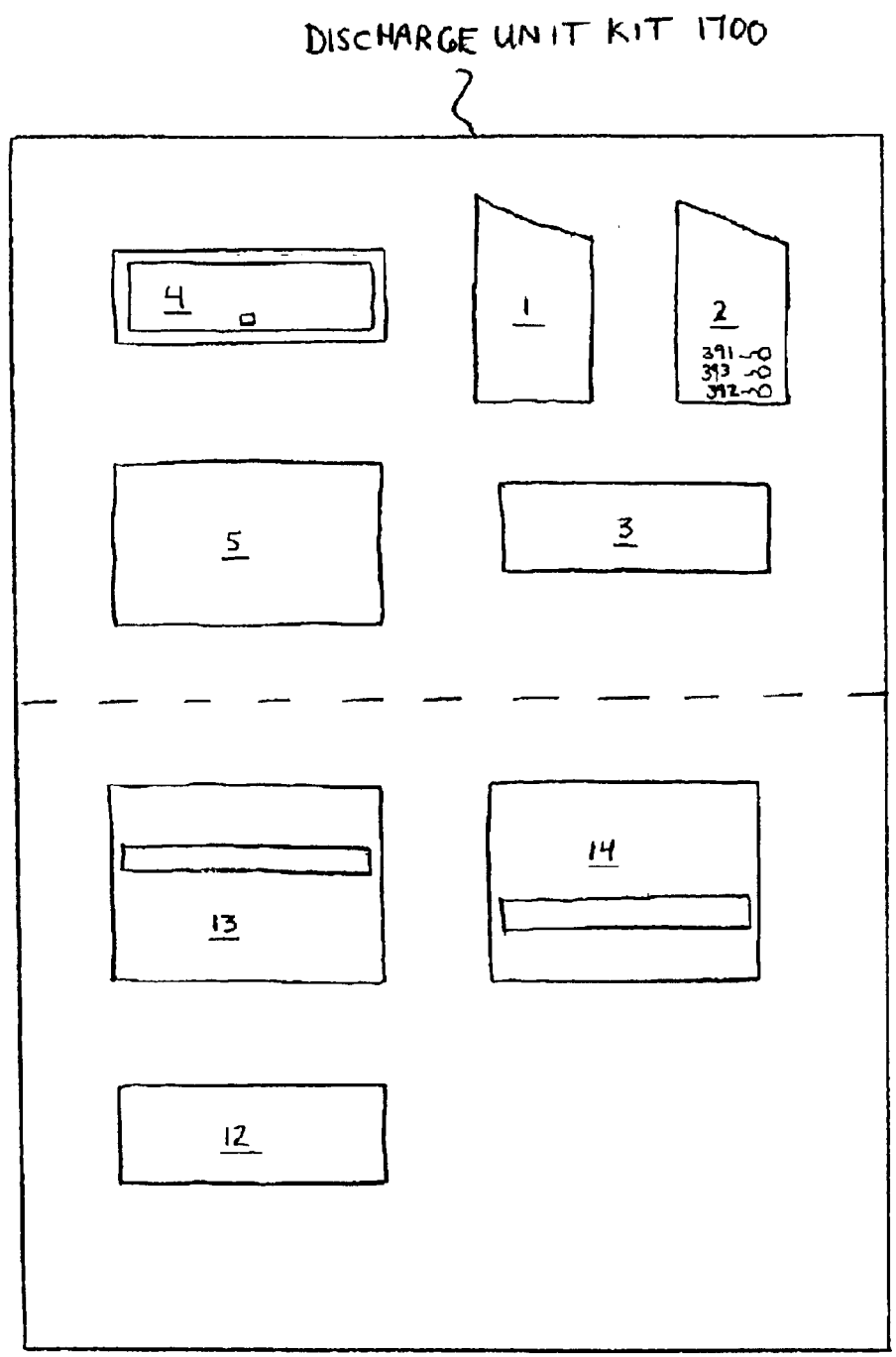
FIG. 17 shows a group or kit of standardized panels that may be used to make up a discharge unit, according to one embodiment of the present invention.

FIGS. 15–17 respectively show groups or kits of standardized panels that may be configured and assembled to make the external housing and the larger internal elements and baffles of a wastewater treatment apparatus having an intake unit, a single GSAF unit, and a discharge unit.

FIG. 15 shows a group or kit 1500 of standardized panels that may be used to make up an intake unit, such as that shown in FIGS. 4–5, according to one embodiment of the present invention. The kit contains both external housing panels to make up the external housing of the intake unit and internal panels to make up certain of the larger or more significant baffles or other internal elements. The external housing panels are shown at the top of FIG. 15, separated from the internal panels by a dashed line.

In the particular kit shown the external housing can be assembled from 5 panels of 5 different types. The different types of external housing panels include a top panel 4, a front left side panel 1, a back left side panel 2, an end side panel 5, and a bottom panel 3. The top panel 4, the front side panel 1, the back side panel 2, the end side panel 5, and the bottom panel 3 may respectively correspond to panels 257, 255, 253, 254, and 256 in FIGS. 4–5. The top panel is shown having an internal door 1301 that is connected to the panel by a hinge along an edge that is opposite a handle 1302. The door may be opened to access the interior of the intake unit. If a conduit 287 is desired to deliver wastewater to the intake unit, a conduit opening 288 may be cut from the end side panel 5. The front 1 and back panel 2 are identical in size and shape except that the back panel 2 contains openings or ports 270, 271, and 272, as discussed in FIGS. 4 and 5. The ports do not have to be on this panel and could be elsewhere. In one alternate embodiment of the present invention the intake unit may be assembled from two front side panels 1, without ports, and then ports may be drilled or otherwise formed either during or after assembly.

The internal baffles of the intake unit can be assembled from 3 baffles of two different types. The different baffles include a first tall baffle 11, a second tall baffle 11, and a lower baffle 12. The first and second tall baffles 11 and the lower baffle 12 may respectively correspond to baffles 250, 251, and 252 in FIGS. 4–5.

FIG. 16 shows a group or kit 1600 of standardized panels that may be used to make up a single GSAF unit, such as that shown in FIGS. 6–7, according to one embodiment of the present invention. In the particular kit shown the unit may be assembled from 8 panels of 5 different types. The different types of external housing panels include a top panel 7, a front panel 6, a back panel 6A, a front sludge bin panel 9, and four trapezoidal panels 8 to form each of the four sides of a bottom cone. The front panel 6, the back panel 6A, the front sludge bin panel 9, and the four panels 8 may respectively correspond to panels 810, 811, 850, and 814–817 in FIGS. 6–7. The top panel 7 has two doors 1401 with handles 1402 for access to the unit. The front panel 6 has an opening 860 to remove a floc blanket.

FIG. 17 shows a group or kit 1700 of standardized panels that may be used to make up a discharge unit, such as that shown in FIGS. 8–9, according to one embodiment of the present invention. The housing panels of the kit are separated from the internal panels by a dashed line. The housing for the discharge unit can be assembled from 5 panels of 5 different types. The external housing panels include a top panel 4, a front right panel 1, a back right panel 2, an end panel 5, and a bottom panel 3. The panels 4, 1, 2, 5, and 3 may respectively correspond to panels 314, 311, 310, 312 and 313 in FIGS. 8–9. It is an aspect of one embodiment of the present invention that each of the panels of the external housing panels of the kit 1500 are identical in size and shape to each of the external housing panels of the kit 1300.

The internal elements of a discharge unit containing a filter unit, such as shown in FIGS. 8–9, may be assembled from three panels of three different types. The different panels include a discharge panel 13, a filter discharge panel 14, and a lower baffle panel 12. The panels 13, 14, and 12 may respectively correspond to 321, 330, and 320 in FIGS. 8–9. Alternatively, the panel 14 may correspond to the structure of panels 330 and 327 as shown in FIG. 9. In a discharge unit without a filter, the panel 14 corresponding to the filter discharge panel 14 may be avoided.

Figure 18:
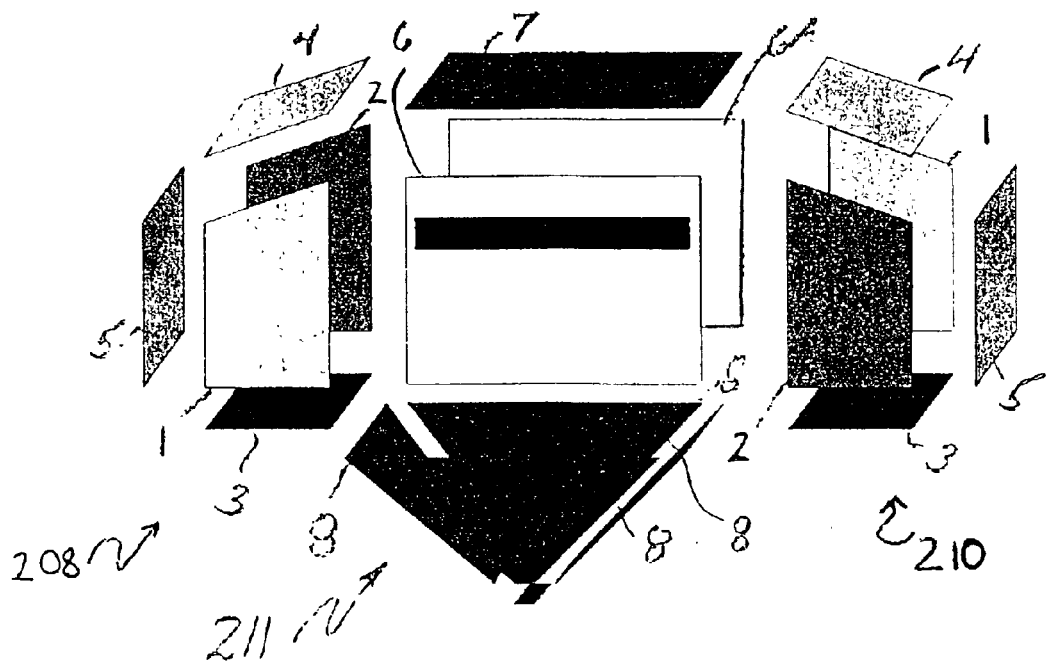
FIG. 18 shows assembly of the sets or kits of standardized panels for the external housings of an intake unit, a GSAF unit, and a discharge unit, according to one embodiment of the present invention.

FIG. 18 shows assembly of the sets or kits of standardized panels for the external housings of an intake unit 208, a GSAF unit 211, and a discharge unit 210, according to one embodiment of the present invention. A sludge bin panel 9 is not shown in order to avoid obscuring the other panels, but may be assembled on the front panel 6 as shown in FIG. 6. The panels may be shipped to the site of a customer wastewater producer and assembled together on site. The panels may be placed in positions so that their edges touch and then the edges may be welded together. The interface between components, such as the intake unit 208 and the GSAF unit 211 may be made by a weld or by nuts and bolts and gasket or other suitable seal. The nuts-bolts-gasket connection may allow simplification of an expansion, although there may be some increased likelihood of a leak. However, an expansion with the welded connection is also possible by cutting through the weld with a plasma cutting tool.

Figure 19:
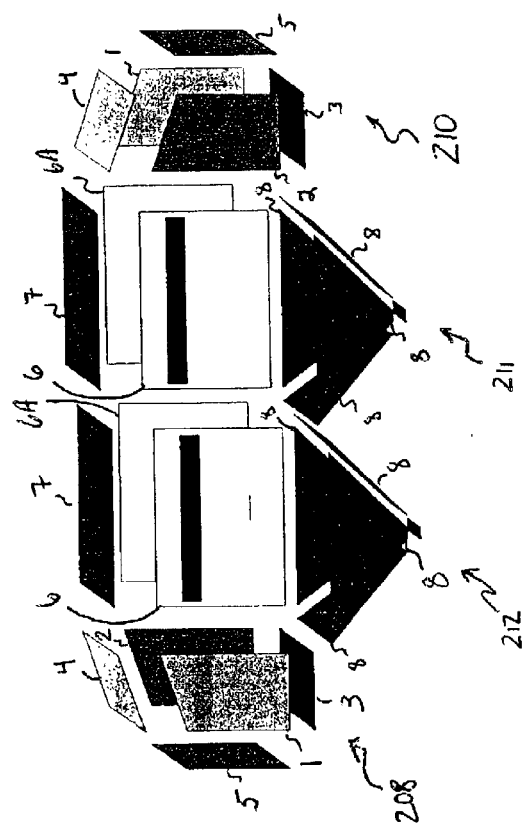
FIG. 19 shows assembly of the sets or kits of standardized panels for the external housings of a wastewater treatment apparatus having a plurality of GSAF units, according to one embodiment of the present invention.

FIG. 19 shows assembly of the sets or kits of standardized panels for the external housings of an intake unit 208, a first GSAF unit 212, a second GSAF unit 211, and a discharge unit 210, according to one embodiment of the present invention. As shown, the two gravity separation air flotation units may be assembled from identical sets of standardized panels having the same sizes, shapes, and configurations for assembly. Of course, any additional desired number of GSAF units may be similarly assembled.

Figure 20:
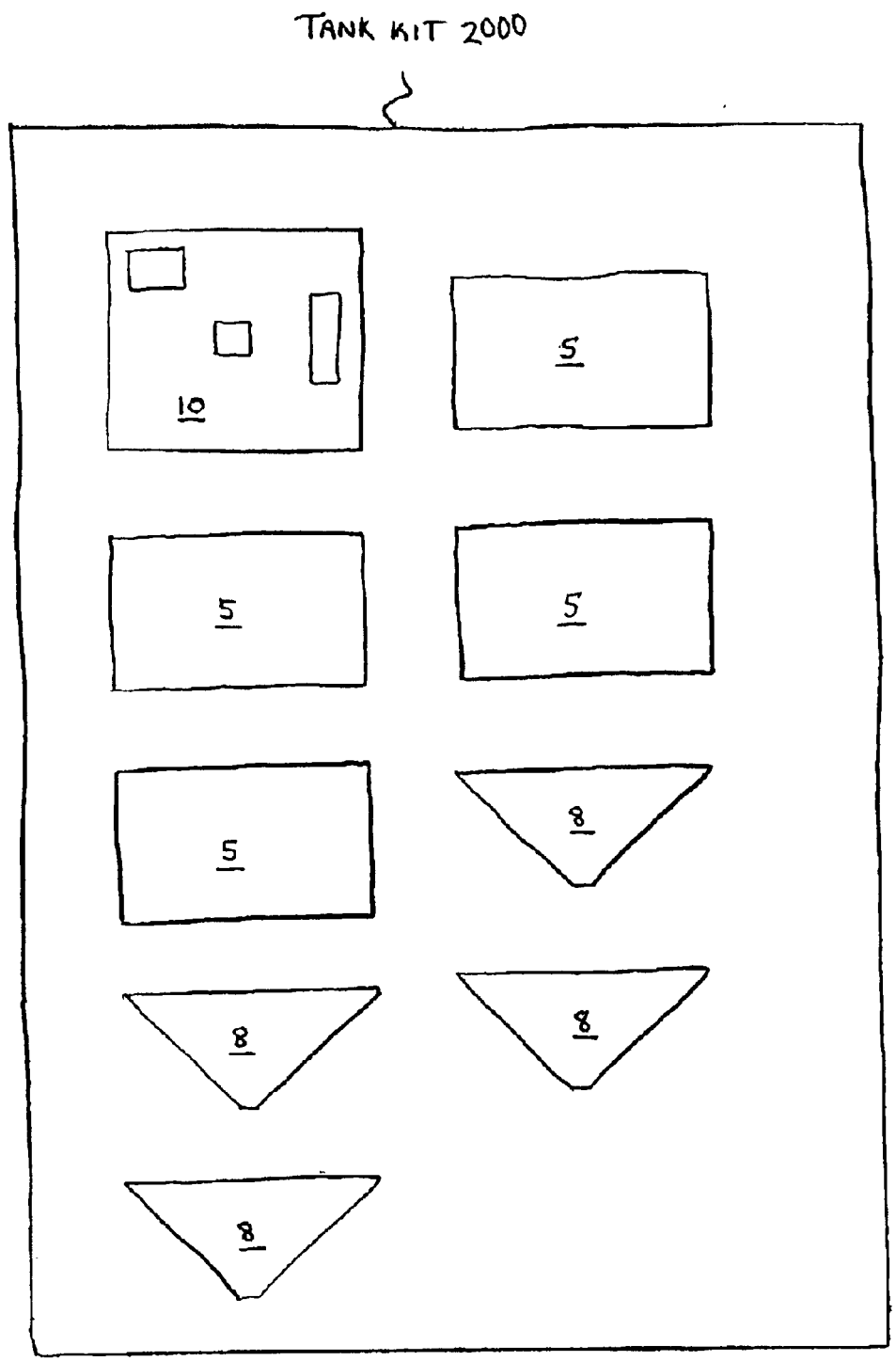
FIG. 20 shows a group or kit of standardized panels that may be used to make up a tank, according to one embodiment of the present invention.
Figure 21:
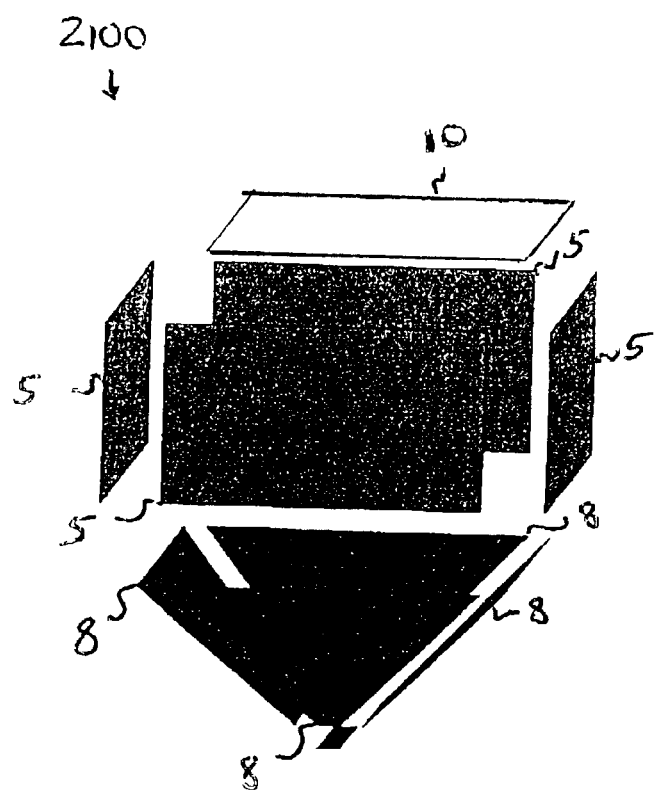
FIG. 21 shows assembly of the group or kit of standardized panels for the tank, according to one embodiment of the present invention.

FIG. 20 shows a group or kit 2000 of standardized panels that may be used to make up a tank, such as a coagulation tank, a flocculation tank, or a sludge tank, according to one embodiment of the present invention. The external housing for the tank can be assembled from 9 panels of 3 different types. The kit includes a top panel 10, four side panels 5, and four trapezoidal panels 8 to form the sides of a bottom cone. The trapezoidal panels 8 may be identical to the trapezoidal panels used to form the bottom cone of the GSAF unit. Additionally, the four side panels 5 may be the same as the end panels of the intake and discharge units. Accordingly, different wastewater treatment system components, including different types of components like GSAF units and sludge tanks, may contain standard shape, size, and configuration panels. FIG. 21 shows assembly of the tank kit 2000.

Another somewhat larger capacity tank may be constructed by replacing the four side panels 5 with four panels 6A. The panel 6A may have the same length as the panel 5, but a greater height, so that the tank has the same footprint when viewed from above but a greater volume than if it was constructed of four panel 5.

The standardized panels that have been described may be made in a variety of shapes, sizes, and from a variety of materials to suite the particular implementation. In one embodiment of the present invention, it is contemplated that the shapes correspond to those shown in FIGS. 15–21, that the sizes correspond to those listed in Table 1, and that the material comprises 306 or 314 stainless steel to provide enhanced durability and appearance. The use of other materials such as carbon steel and aluminum is also contemplated.

TABLE 1

Exemplary Dimensions for Standardized Panels

| PANEL | LENGTH (FEET) | WIDTH (FEET) |
|---|---|---|
| 1 | 4 or 5 | 3 |
| 2 | 4 or 5 | 3 |
| 3 | 7 | 3 |
| 4 | 7 | 3.16 |
| 5 | 7 | 4 |
| 6 | 7 | 5 |
| 7 | 7 | 7 |
| 8 | 7 | 3.25 |
| 9 | 6.5 | 4 |
| 10 | 7 | 7 |
| 11 | 7 | 3 |
| 12 | 7 | 1.67 |

TABLE 1-continued

Exemplary Dimensions for Standardized Panels

| PANEL | LENGTH (FEET) | WIDTH (FEET) |
|---|---|---|
| 13 | 7 | 4 |
| 14 | 6 | 4 |

There are a number of significant and commercially important relationships amongst the dimensions of the standardized panels listed in Table 1. Of significance is that the length and width of the GSAF unit are the same. This affords making the length and width of the top of the cone with the same length and width and means that the cone may be made out of four identical panels. That is, since the length of panels 5 and 8 may both be 7-feet, the cone may be constructed of four identical panels 8 that have a length along the top surface that is also seven feet. This avoids the need to manufacture different cone panels, which would be the case if the length of panel 5 were different from the length of panel 8, and may provide reduced cost of making the cone. The same benefit may be realized in a tank having a cone. For example, in a tank constructed of four side panels 5 each having a length of 7-feet, the cone may be constructed of four identical cone panels 8 also having a length along the top edge of 7-feet.

Another significant advantage of the particular set of dimensions listed in Table 1 is that a wastewater treatment apparatus assembled from standardized panels may have a width that is under 8½ feet (a significant measurement for shipping on a horizontal truck), which may reduce the cost of shipping and avoid the need to obtain permits. Consider an exemplary apparatus assembled as shown in FIG. 18. The apparatus may have a width that is just under 8½ feet from the top panel 7 to the bottom of the conical bottom. The dimension from the back panel 6A to the front panel 6 plus the dimension of an attached sludge bin hopper may also be under 8½ feet.

The present inventor has found that, depending upon the amount and nature of the contaminants in a wastewater, a wastewater treatment apparatus having a single GSAF unit assembled from panels having the sizes of Table 1 should have sufficient capacity to treat between about 50–100 gallons per minute, or more, wastewater. Because this capacity may be more than that needed by many wastewater producer customers, it may be desired to manufacture each of the standardized panels in one or more additional standard sizes. For example, each of the panels listed in Table 1 may be made with half the sizes listed. These panels may be assembled as a wastewater apparatus that is sufficient to treat a smaller capacity of wastewater, for example between about 25–50 gallons per minute, and may be desired by certain wastewater producers due to its smaller size or cost. The smaller wastewater capacities may also be accommodated by operating the apparatus in a batch mode with some downtime, as desired.

By discovering this embodiment the present inventor has solved a previously unrecognized problem, namely a way to make modularized wastewater system components out of standardized panels rather than custom designing each wastewater system component based on the particular wastewater flows and properties. By making the panels in a standard size, rather than custom making each wastewater treatment apparatus or tank, there may be significant savings in manufacture, shipping, installation and operation of the system. One big advantage due to the standard sized panels is that the manufacturing line can continue producing the standardized size panels because it is known that there are a limited number of fixed size systems that serve multiple wastewater producer customers operating over a wide spectrum of capacities. Up until the discovery by the present inventor of this embodiment, the advantages of the significantly decreased manufacturing, shipping, and installation costs has been unappreciated and unrecognized in the art of wastewater treatment. Although standardization and modularization are known concepts, these advantages have not been recognized in the wastewater treatment industries and standard size and configuration wastewater treatment systems and apparatus like those disclosed herein are not known to exist. The recognition of the previously unrecognized problem and disproportionate advantages that result from the solution mitigates in favor of patentability. The fact that the art of wastewater treatment is old and crowded further indicates the significance of the discovery of this embodiment inasmuch as even small steps forward in an old and crowded art are significant advances.

VII. Expandable Wastewater Treatment Apparatus

It is an aspect of one embodiment of the present invention that the wastewater treatment apparatus 206 be expandable by insertion of an additional modular component or unit. The component, for example a GSAF unit, may have complimentary and compatible size, shape, and configuration, as that of the existing apparatus and its units to allow for modularity and expandability of the system in that other components may be added.

Figure 22:
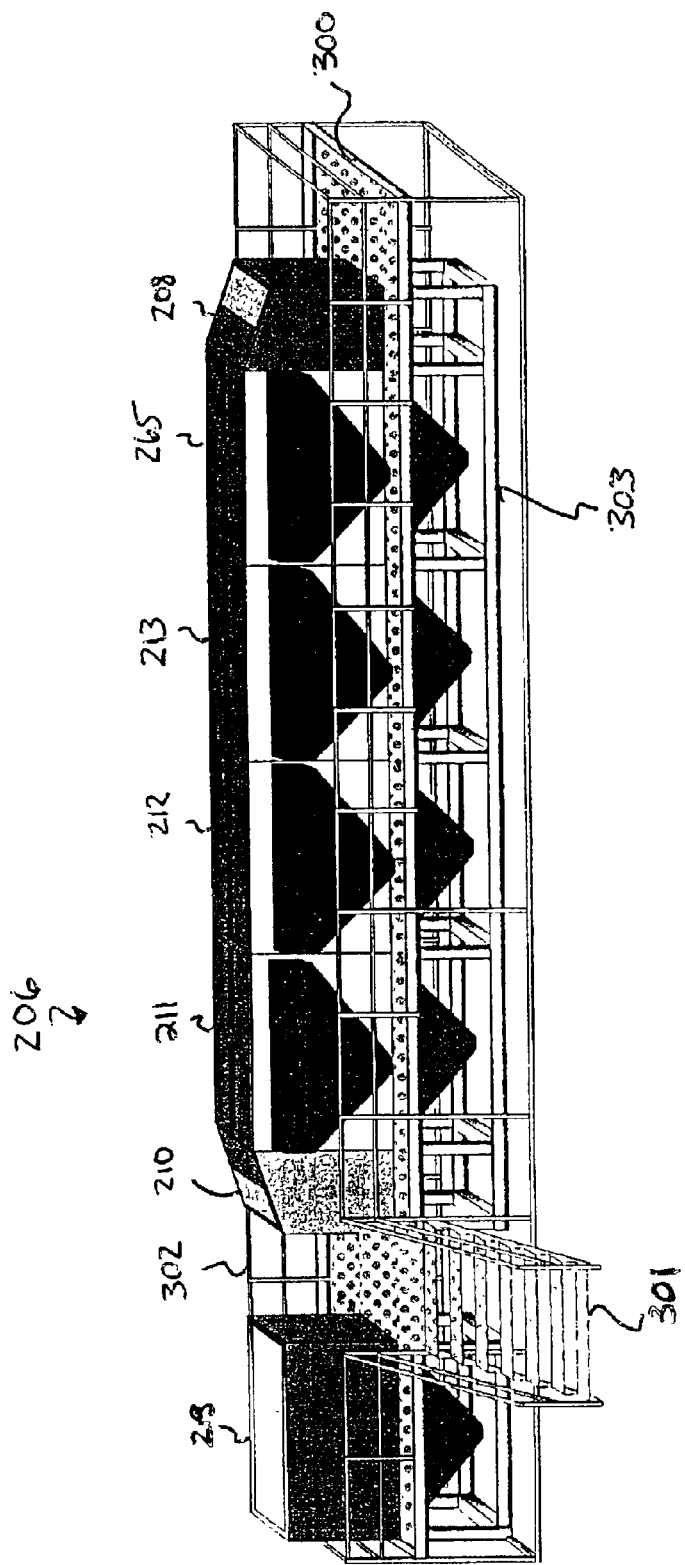
FIG. 22 shows a layout for a tank and a wastewater treatment apparatus, according to one embodiment of the present invention.
Figure 25:
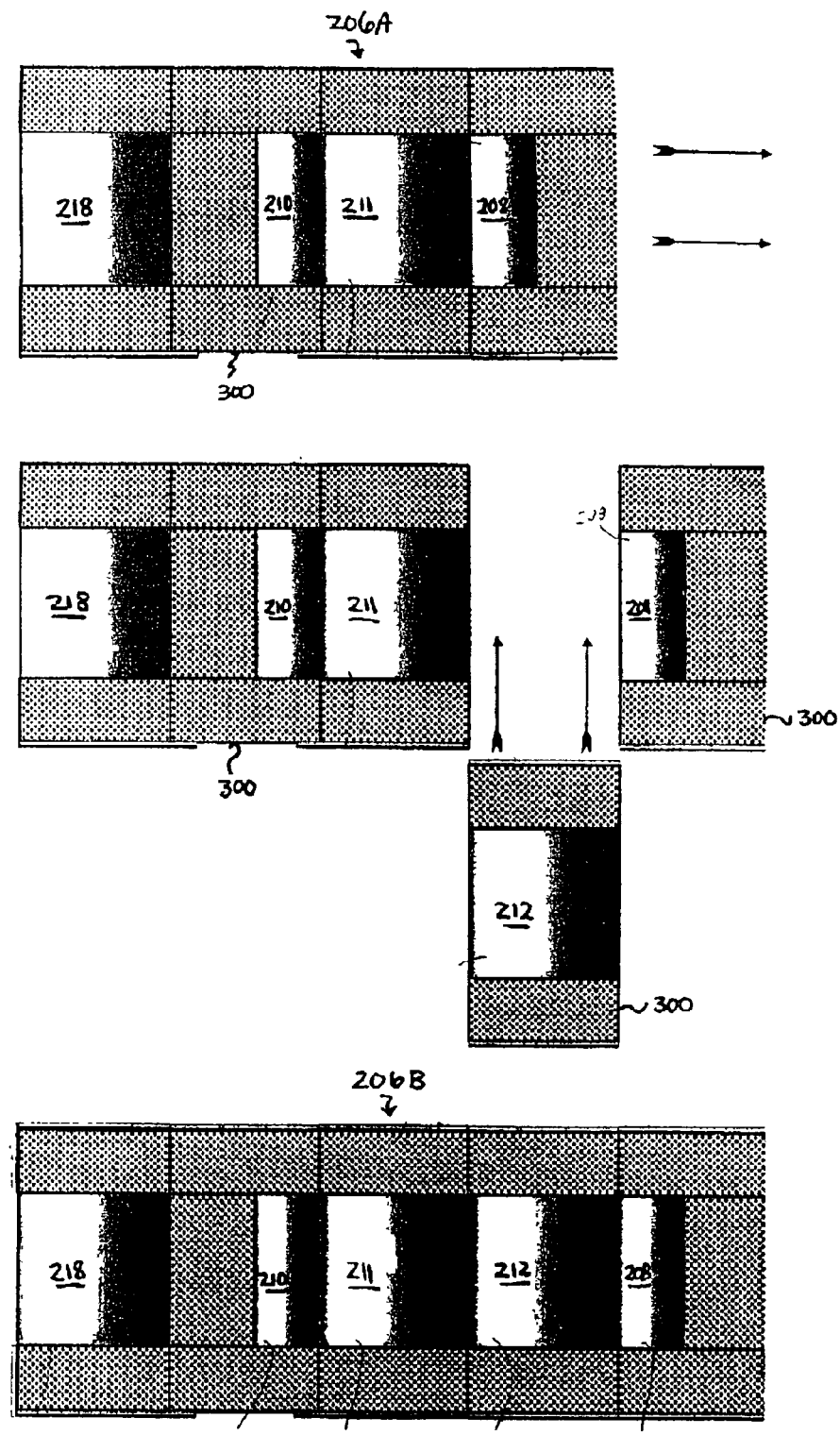
FIG. 25 shows a method for inserting a GSAF unit into a wastewater treatment apparatus, according to one embodiment of the present invention.

FIG. 22 depicts the layout of a tank 218 and a wastewater treatment apparatus 206 having an intake unit 208, four GSAF units 211, 212, 213, and a discharge unit 210, according to one embodiment of the present invention. The tank and the GSAF units have conical bottoms and are elevated above the ground for access to the conical bottoms for servicing and removal of the sludge. The tank 218 and the apparatus 206 are supported by an integral support structure 303 that provides a common platform 300 that is elevated above the ground to provide access to the tops of these units for inspection and servicing. The platform may contain a number of standardized walkway section panels, as shown in FIG. 25. The walkway panels may have the same length as a GSAF unit to allow ease of insertion of a GSAF unit. The platform is accessed by stairs 301 and has railing 302 around the platform for safety purposes. As desired, additional tanks, such as the coagulant tank 281 and the flocculation tank 284 shown in FIG. 3, may be provided alongside the tank 218. Chemical treatment and pressurized air containers may be provided beneath the platform 300, or in other suitable locations.

Figure 23:
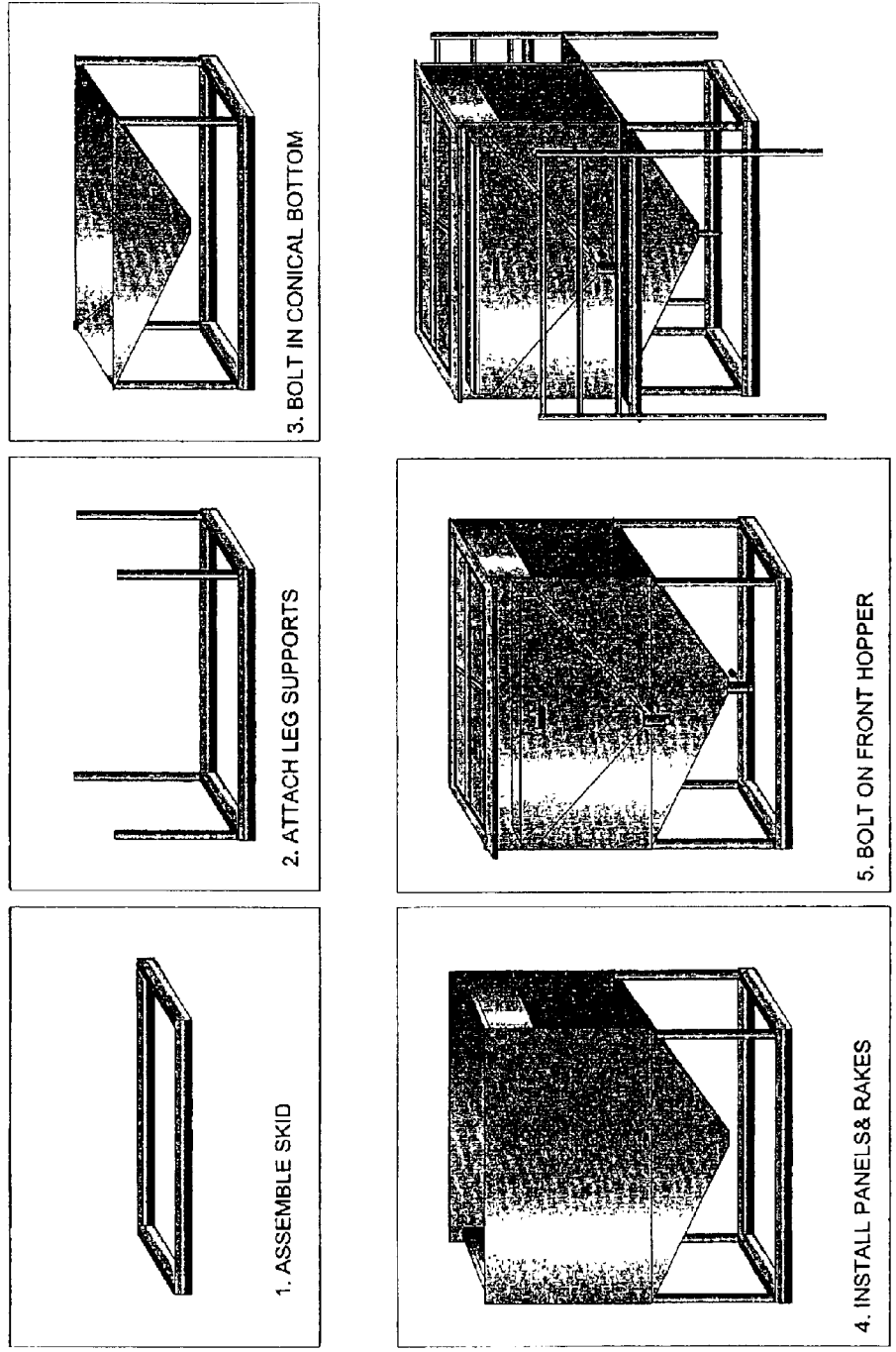
FIG. 23 shows a method for assembling a modular GSAF unit, according to one embodiment of the present invention.

The components may be designed with modular and expandable skids, piping, walkways, electrical components, and other structures that have predetermined modular separations that allow the system to expand to allow a new component to be added to increase the systems processing capacity. FIG. 23 shows a method for assembling a modular GSAF unit, according to one embodiment of the present invention. The method begins by assembling the skid from standardized sections. Legs are then attached at corners of the skid to support the GSAF unit. Then the control bottom of the GSAF unit is assembled by welding the standardized panels together and boiling the conical bottom to the support. Next, the front and back panels and the rake supports may then be installed. Then the sludge bin hopper may be bolted to the front panel. Railing and walkways may then be assembled around the unit by using standardized and modular components.

Figure 24:
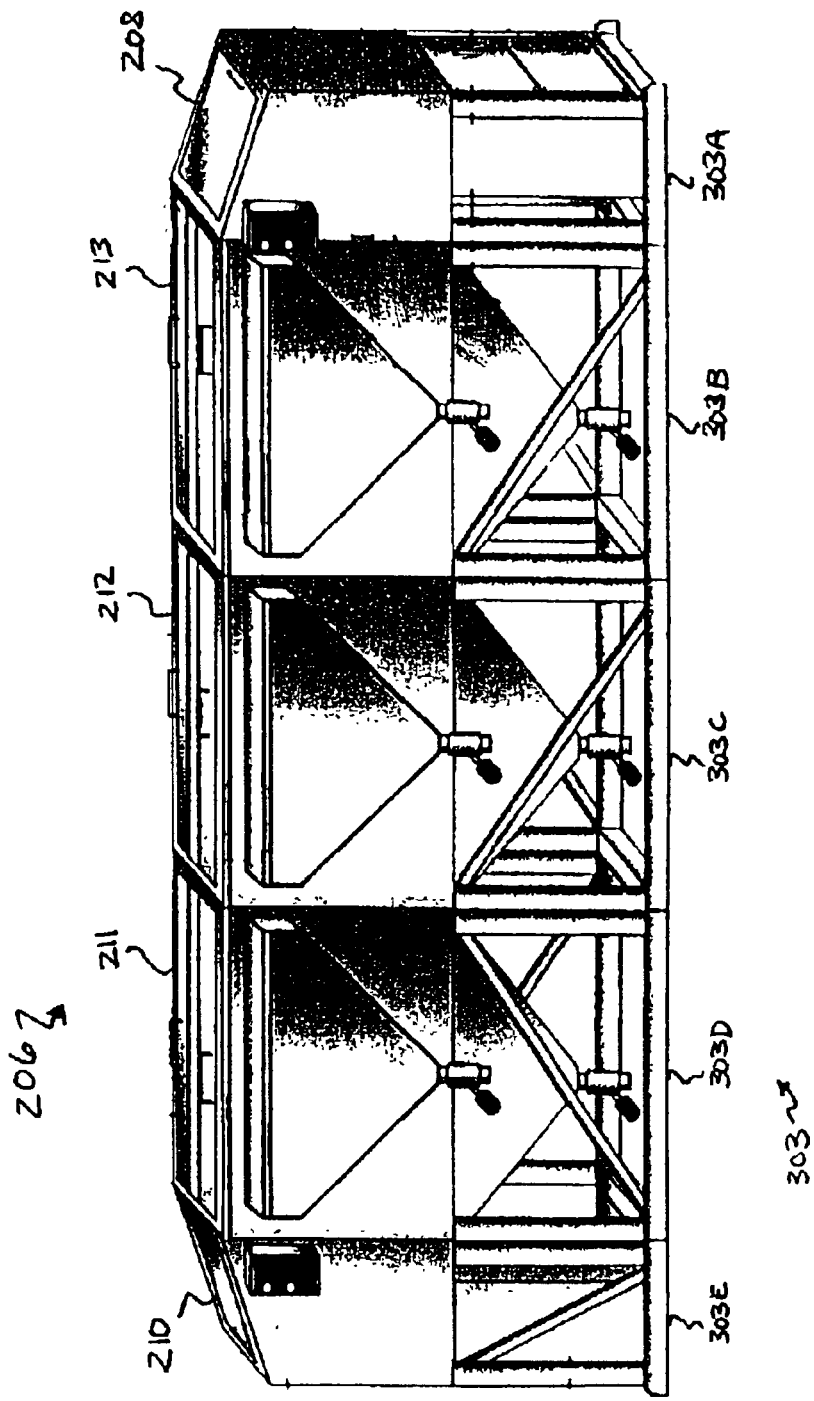
FIG. 24 shows a view of the front of a modular wastewater treatment apparatus containing units on modular support structures, according to one embodiment of the present invention.

FIG. 24 shows perspective view of the front of a wastewater treatment apparatus 206 having a support structure that is modularized into component support structures 303A–E that correspond to the different components of the apparatus 206, according to one embodiment of the present invention. The intake unit 208 is supported by a first modular structure 303A, the first GSAF unit 213 is supported by a second structure 303B, the second GSAF unit 212 is supported by a third structure 303C, the third GSAF unit 211 is supported by a fourth structure 303D, and the discharge unit 210 is supported by a fifth structure 303E. Each of the component support structures 303A–E is a freestanding mechanical support structure to support its wastewater treatment apparatus component and that may be connected together, as shown, to form an integral support structure 303 for the apparatus 206. The wastewater treatment apparatus components may be moved and assembled by moving or sliding their support structures and they may be attached through welds, or nuts and bolts which may allow easier separation of the units. The piping may also be modularized with flanges provided between the units and with regular fixed sections of pipe that may be added when an additional component is added. Likewise, the electrical system may be modularized with junction boxes for each modular unit to allow disconnecting to allow insertion of a modular component and reconnecting the apparatus.

FIG. 25 shows a method for inserting a GSAF unit 212 into a wastewater treatment apparatus 206A to expand the apparatus and form a second wastewater treatment apparatus 206B that has a greater wastewater treatment capacity, according to one embodiment of the present invention. In the particular embodiment shown, the GSAF unit 212 is inserted between an intake unit 208 and an existing GSAF unit 211, although in other embodiments the GSAF unit 212 could be inserted between the discharge unit 210 and the GSAF unit 211, or between two existing GSAF units.

A first top plan view, at the top of the figure, shows a sludge tank 218, a discharge unit 210, a GSAF unit 211, an intake unit 208, and a plurality of standardized platform walkway section panels 300. The walkway panels 300 have the same length as the GSAF unit top panel 7 and are configured into alignment with the side of the GSAF unit 211. In this way, when the GSAF unit 212 is inserted, two additional standardized walkway panels 300 may be inserted. It is also contemplated that the walkway panels 300 could be standardized so that an integer number of the walkway panels 300 would have the same length as the top panel 7, which would also avoid the need to cut walkway panels to length. In this way, by standardizing the walkway sections so that they have some regular standardized relation to the component in an extendable and modular wastewater treatment apparatus, the apparatus may be expanded by inserting standardized modular components, such as GSAF units, without needing to cut non-standardized walkway materials to length.

The intake unit 208 is moved or slid in the horizontal direction, as indicated by the arrows. This may include detaching the pipes of the existing apparatus 206A, which may be underneath the unit and along the side of the unit. In one embodiment of the present invention, it is contemplated that the pipes between the intake unit 208 and the GSAF unit 211 are connected by flanges or otherwise so that they may be disconnected. This may also include detaching the support structures for the units, which may be connected with nuts and bolts. After all needed detachments are made, the intake unit may be slided or otherwise moved, on its support structure, in the direction indicated by its arrows for a distance that is sufficient to accommodate an additional GSAF unit 212.

As shown in the second top plan view, in the middle of the figure, the second GSAF unit 212 may be slid or otherwise moved into the former location of the intake unit 208. The second GSAF unit 212 is a modular structure, substantially similar in size, shape, and configuration to the first GSAF unit 211, that may be inserted alongside the first GSAF unit 211, at an internal location within the wastewater treatment apparatus. The pipes, structures, and other portions of the new second GSAF unit 212 may be attached to the pipes and structures of the old existing GSAF unit 211 and intake unit 208.

The third top plan view, at the bottom of the figure, shows the expanded capacity wastewater treatment apparatus 206B containing the inserted second GSAF unit 212. As has been previously discussed, it is an aspect of one embodiment of the present invention that the unit 212 is a modular unit having a standardized size, shape, and configuration of the standardized panels shown in FIG. 16. In this way, if a customer's capacity needs increase, certain standardized panels shown in FIG. 16 and other standardized components associated with the unit 212 such as two walkway panels 300 and certain desired piping and support structure components may be shipped to the customers site as a kit for assembly in the field. This may allow the capacity of the customers' wastewater treatment apparatus to be expanded in a convenient and affordable way that makes reuse of the existing wastewater treatment apparatus to save cost. The modular, expandable, and standardized nature of the wastewater treatment apparatus 206, its piping, its support structures, and its platform and walkway panels offers a significant advantage over prior art wastewater treatment systems in that the capacity of the apparatus may be expanded simply by the insertion of additional modular and standardized wastewater treatment apparatus components.

Although there are many alternate methods that are contemplated for expanding a wastewater treatment apparatus by adding and attaching a modular unit to the apparatus, consider the following exemplary method that further illustrates the concepts. Initially, a GSAF unit that is to be inserted into the existing apparatus may be assembled as shown in FIG. 23. The existing apparatus may be prepared for insertion of the unit by detaching the walkways, skids, and any other support structures connecting the existing GSAF unit and intake unit. Piping such as the sludge line, recycle line, treated wastewater effluent line, pressurized air line, and other lines may be disconnected. Also, the electrical connections may be disconnected in the junction boxes. Each of these systems may be modular with the use of bolts to connect the skids between the units, flanges to connect the pipes between the units, and separate junction boxes for each separate unit to connect the electrical systems. Such separations in these systems provides modularity to the apparatus and facilitates insertion of a module. The existing GSAF unit is then detached from the intake unit. Often these units may be welded and may be separated by cutting the inside seam with a plasma cutter. After making such cuts the intake unit may be slid away from the existing GSAF unit a distance sufficient to allow insertion of the new GSAF unit. The new GSAF unit may then be slid or otherwise moved into position between the existing GSAF unit and the intake unit. The skids of the existing units and the new unit may then be aligned and fastened together so that they are integral. This may include aligning the flanges of the skid in the existing and new units and bolting the flanges together. Then the flanges of the existing GSAF unit may be clamped to those of the new unit and the flanges of the new unit may be clamped to those of the intake unit. Then standard sized sections of pipe may be inserted and attached to the existing pipes. For example, seven foot sections of flanged pipe may be attached to the recycle line, the sludge line, and any other lengthened lines. Then, the rake assembly of the new GSAF unit may be attached to the shaft of the rakes of the existing GSAF unit. Then, the clamped panels of the existing units may be aligned with those of the new unit and welded together into connection as previously described and shown. Then two solenoid valves may be installed in the pneumatic control box and air lines may be run from the solenoid valves to the pneumatic valves on the new GSAF unit. Then new plates may be added to the control box for the unit, switches installed, and the plates and solenoid valves suitably wired. After any such mechanical, piping, and electrical connections of the unit to the apparatus, the walkways and hand rails may be bolted to the existing structures to make the unit ready for startup.

VIII. Improved Flotation Rake Containing Wheels

Figure 26:
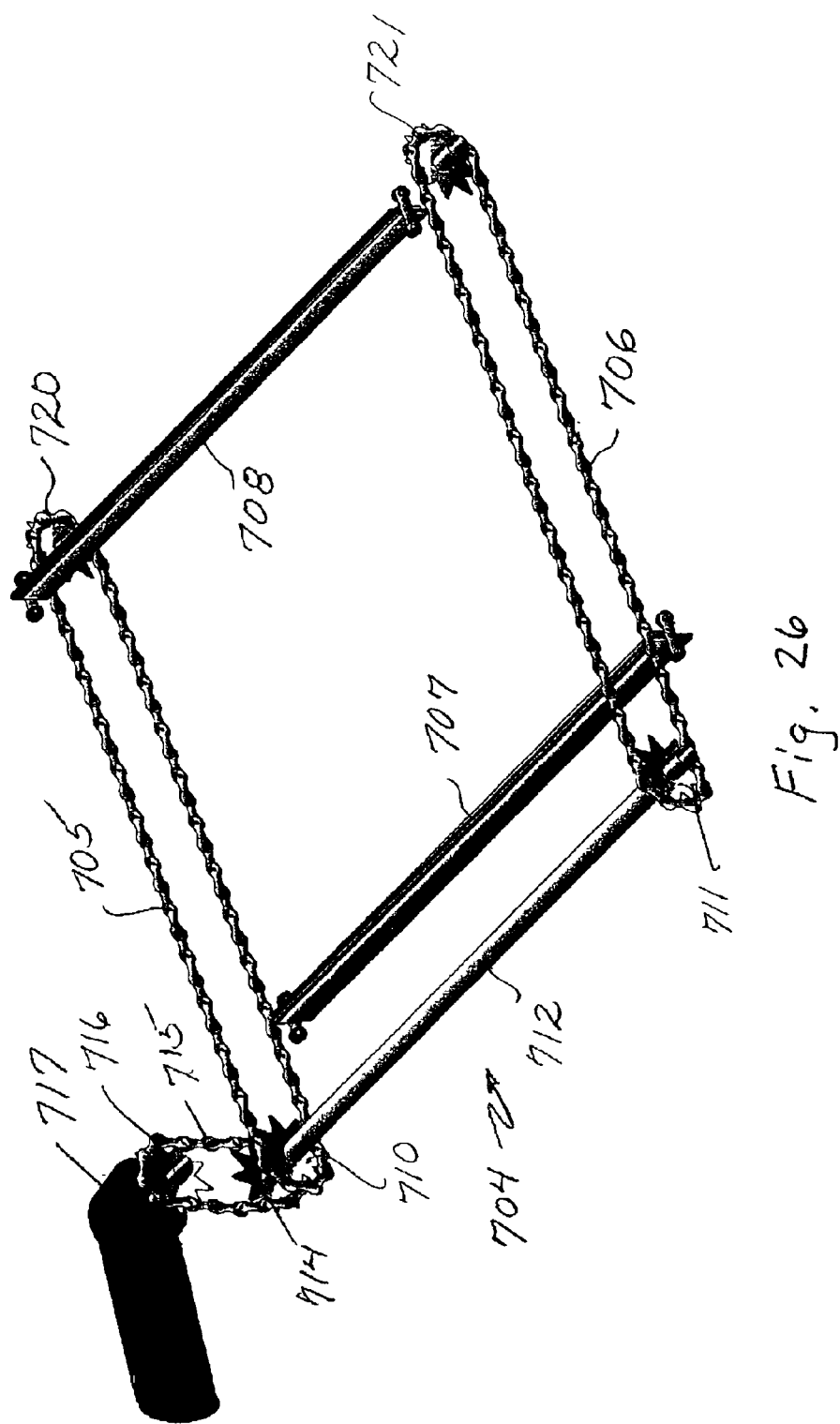
FIG. 26 shows a perspective view of a rake having rollers attached to the ends of the blades, according to one embodiment of the present invention.
Figure 27:
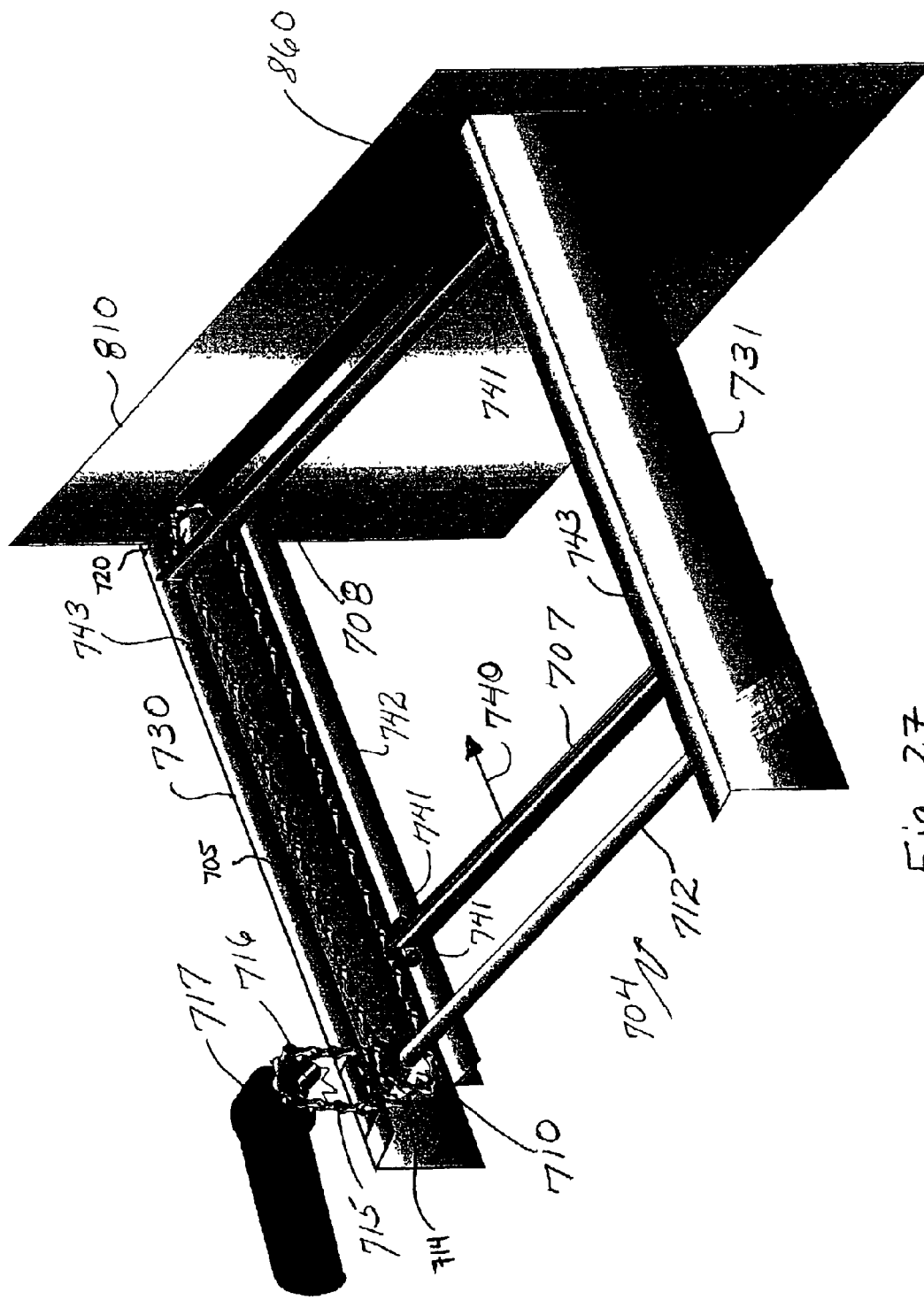
FIG. 27 shows a perspective view of a rake, showing the mounting of the rake, and showing surfaces to support the rollers on the blades of the rake, according to one embodiment of the present invention.

FIGS. 26–27 show perspective views of a rake 704 for removing a flock blanket from the top of the wastewater flowing through a wastewater treatment apparatus 206, in accordance with one embodiment of the present invention. As particulate contaminants float to the top of a GSAF unit and form a floc blanket, it gets to the point where it is desirable to remove the contaminants from the unit by scraping the floc blanket into and through the opening 860 of the GSAF unit with a rake. The floc blanket, of course, contains the particulate matter that has floated to the surface of the wastewater that is passing through the wastewater treatment apparatus. The weir 323 in the discharge unit is raised a selected level, for example 2½ inches, so that the water level in the GSAF units comes just below the opening 860 of the front panels 810. In this way, the bottom of the floc blanket and the top of the water are slightly below the bottom of the opening 860. At this point, the rakes are turned on to remove the floc blanket and the contaminants therein by pushing the floc blanket through the openings. The rakes 704 are left on for a selected period of time until the floc blanket has been removed and are then shut off to permit the formation of a new floc blanket.

The rake 704 has two drive chains 705 and 706. Two wiper blades 707 and 708 are attached at each end to one of the chains 705 and 706, such as by welding or bolts. The blades may each contain a strip of rubber bolted between metal plates, as shown. Chain 705 is driven by drive sprocket 710 and chain 706 is driven by drive sprocket 711. The drive sprockets 710 and 711 are mounted on a common drive shaft 712 at opposite ends thereof. Drive shaft 712 extends through sprocket 710 and terminates in a sprocket 714. Sprocket 714 is driven through a drive chain 715, and a sprocket 716, by a drive motor 717. Chain 705 extends between drive sprocket 710 and an idler sprocket 720. Chain 706 extends between drive sprocket 711 and an idler sprocket 721. Each side of the rake 704 is attached to and supported by an arm 730 and 731. Each arm 730 and 731 is attached to and extends from the two side panels 810 and 811 of a GSAF unit, such as GSAF unit 211. Although they have not been shown in order to avoid concealing the chain and other components, conventional covers will often be provided along the length of the chain to help keep it clean and protected.

As the blade 707 moves in the direction of the arrow 740 shown in FIG. 26, the blade pushes the floc blanket on top of the water flowing through the GSAF unit toward and into the opening 860 in the front panel 810 of the GSAF unit. There are wheels or rollers 741 on each blade that are supported on a shelf 742 and 743 of the arms 730 and 731. The wheels may be attached to metal plates that are welded, bolted, or otherwise fastened to the metal plates of the blade. Standard commercially available rubber wheels having any desired diameter, such as 1⅜ inch, may be used. There may be two or more wheels at each end of the blade. The lower shelf 742 supports the blade that is pushing the floc blanket while the upper shelf 743 supports the blade while it returns to the position of the lower blade where it will again push the floc blanket. Accordingly, the weight of the blade rests upon and is supported by the shelfs in both directions. By resting on the shelves 742 and 743, the blades have a level path of travel and do not hang down or sag the chain, and further the rollers, in supporting the blades, relieves the pressure and stress on the joint where the blades are attached to the chain.

Figure 28:
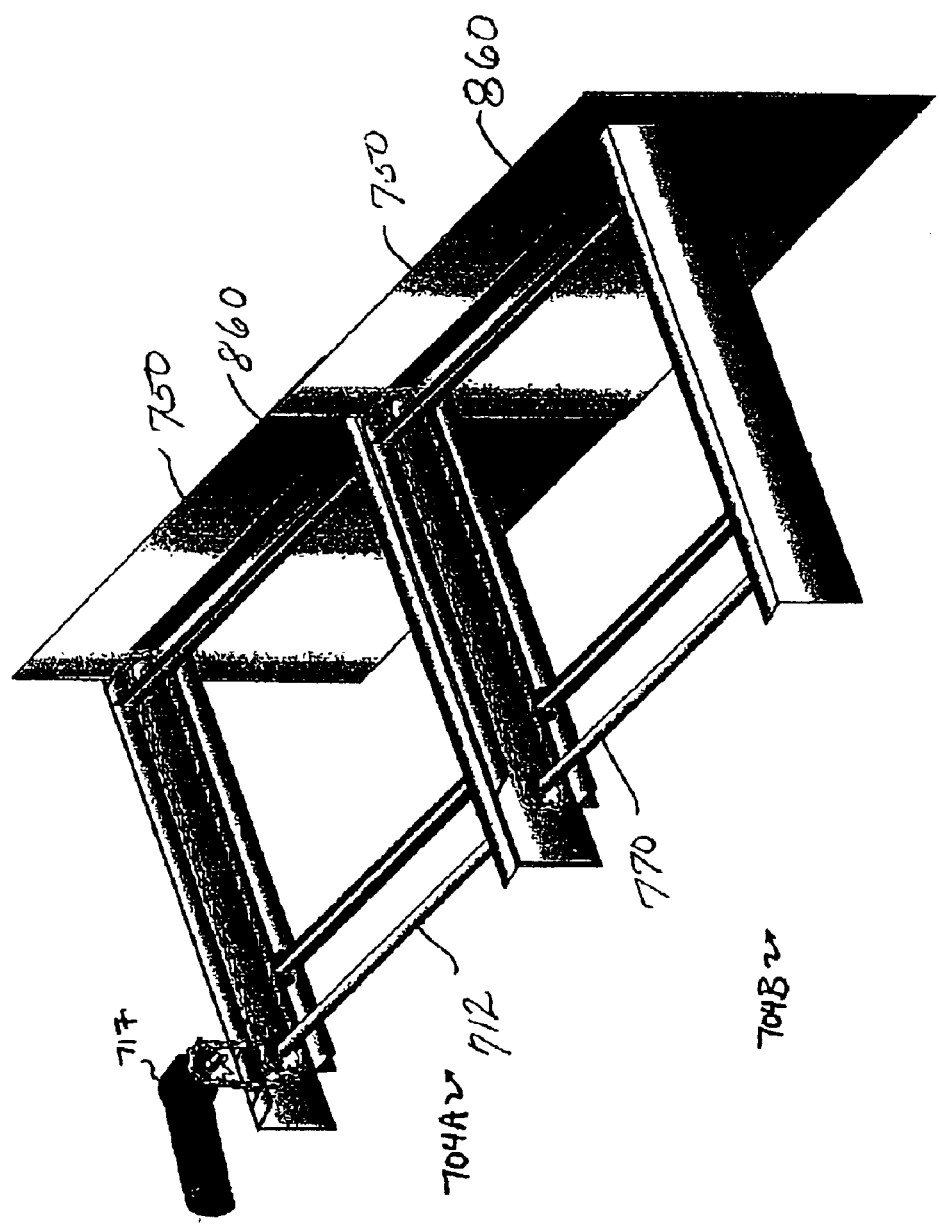
FIG. 28 shows a perspective view of two rakes that are joined and driven by a common motor for two adjacent GSAF units, according to one embodiment of the present invention.

FIG. 28 shows a plurality of rakes 704A and 704B that may be used to remove the floc blanket from a wastewater treatment apparatus, according to one embodiment of the present invention. The drive motor 717 is mounted on top of the end GSAF unit for driving one or more of the rakes 704A–B. The second rake 704B has its drive shaft 770 connected to the drive shaft 712 of the first rake 704A, so that the turning of drive shaft 712 will turn the drive shaft 770, and operate the second rake 704A. The first rake 704A may remove the floc blanket from a first GSAF unit, such as GSAF unit 213 of FIG. 2, and the second rake 704B may remove the floc blanket from a second adjacent GSAF unit, such as unit 212 of FIG. 2. That is, each of the modular GSAF units in a wastewater treatment apparatus may have their own modular raking systems. The use of the modular raking systems may allow ease of expansion of the wastewater system by insertion of an additional GSAF unit and its modular rake. The drive shaft of the added rake may be coupled with the drive shaft of the existing rake so that the drive motor rotates the added drive shaft and operates the rake on the new unit. The use of multiple rakes in a wastewater treatment apparatus, one for each of the GSAF units, may also reduce the amount of stress on the points of attachment of the blades to the chains due to a reduction in the weight and span of the blades. There may be less sagging in the chains than would be the case if a larger and heavier single blade were used. Of course it is to be appreciated that the improved rake designs shown need not be included in each embodiment of the present invention.

IX. Sludge Tank Having a Hopper for Material Additions

Figure 29:
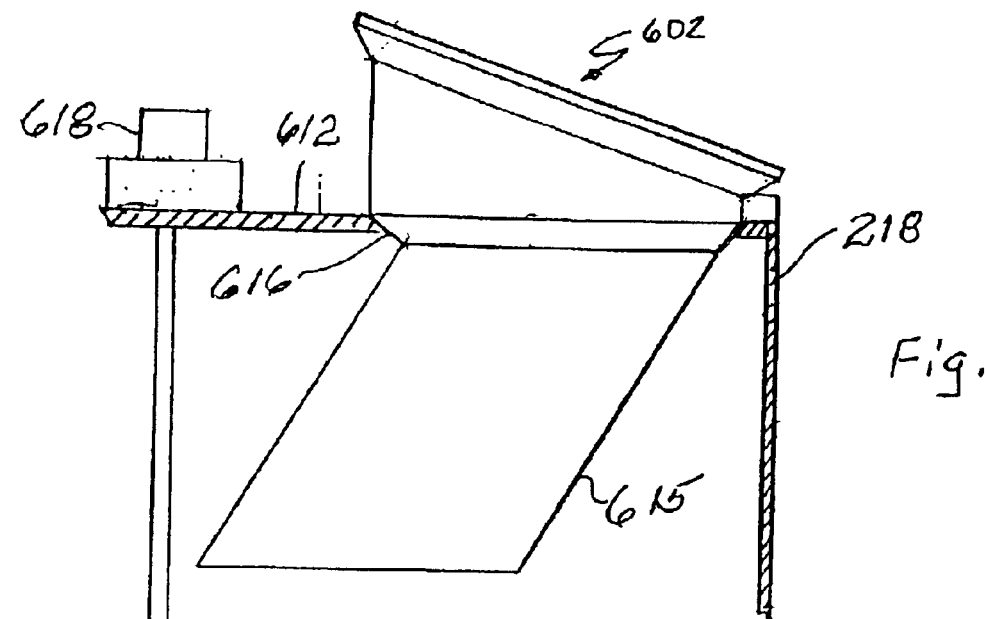
FIG. 29 shows a top plan view of a hopper and a cuter on the hopper attached to the top of a sludge tank with the lid open, according to one embodiment of the present invention.
Figure 30:
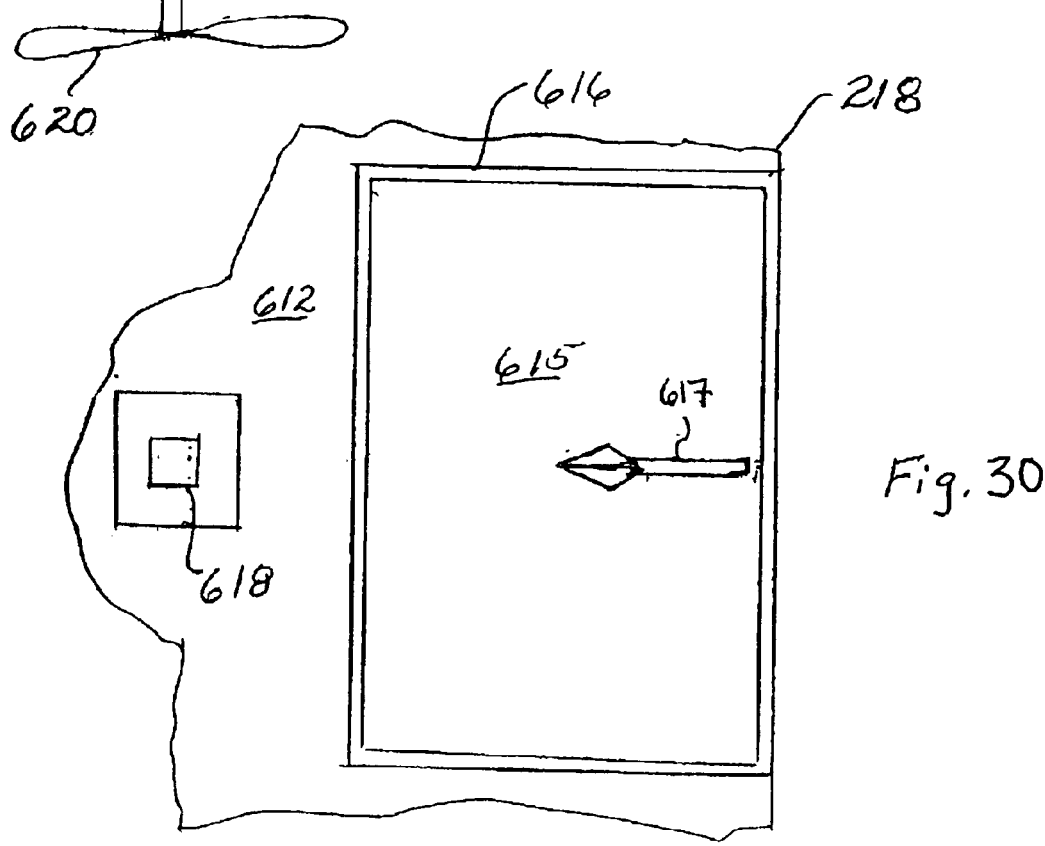
FIG. 30 shows a side elevation view of a hopper chute and a mixer blade inside a sludge tank, according to one embodiment of the present invention.

FIGS. 29–30 show a sludge tank 218, containing a cutter 617 and a chute 615 to help add material to the tank, according to one embodiment of the present invention. The sludge tank 218 may be used to collect and store sludge, containing particulate contaminants from a wastewater treatment system, prior to disposal of the sludge to a sludge press or other de-watering process.

Materials such as diatomaceous earth or pearlite are often added to the sludge tank to thicken the sludge, make it easier to handle, or aid in the drying process. Such thickening materials are well known and include diatomaceous earth, rice seed hulls, or other materials. A mixer is added to the sludge tank for mixing such materials with the sludge and contains a mixer motor 618 mounted on a top cover 612 and a mixing blade 620 that is driven by the motor 618.

The sludge tank includes a hopper 602 in the top of the tank attached to the top cover 612 for access to add material, such as diatomaceous earth, to the sludge in the tank. One significant problem with prior art sludge tanks is that the materials added to the tanks often collected in the bottom of the tank because of poor mixing. To help overcome this problem, a chute 615 is attached to the frame 616 of the hopper 602 to direct the material into the area of the mixer blade 620 to enhance the mixing of the material with the sludge. The chute 615 is angled away from the side of tank 218 and directs the addition towards and into an area in the center of the tank 218 that is mixed by the blade 620. This results in improved mixing and more efficient use of the addition.

Materials that are added to the sludge tank, such as diatomaceous earth, often come in bags or other containers. The tank contains a cutter 617 inside the hopper just below the lid, so that bags that are placed in the hopper and into contact with the cutter may be cut and broken apart and the contents emptied into the hopper. The cutter could include any object having a sharp edge, such as a blade, or pointed end, such as a nail, that is sufficient to cut plastic or fabric bags containing the material under the force of the weight of the bag.

Materials may be collected in the sludge tank until it is desirable to dispose of the sludge to a de-watering or other disposal process. Of course, depending upon the particular sludge, it is contemplated that the sludge could be recovered for reuse. As desired, level controls could be included on the sludge tank to prevent overflow by deactivating the sludge pump and initiating a beacon light or other stimulus to alert operators that the sludge tank is full and ready for processing.

Thus, wastewater treatment systems and methods have been described. Although described with reference to specific embodiments it should be remembered that various modifications and changes may be made to the techniques described herein without departing from the broader spirit and scope of the invention. The specification and drawings are accordingly to be regarded in an illustrative rather than a restrictive sense and the invention measured only in terms of the claims, which follow.

What is claimed is:

1. A wastewater treatment apparatus to decontaminate a wastewater comprising:
   a wastewater intake unit;
   a decontaminated water discharge unit; and
   a plurality of gravity separation air flotation units connected together and connected between the intake unit and the discharge unit;
   a rake having an attached blade to remove a floc blanket from the top of at least one of the plurality of gravity separation air flotation units, the attached blade having a roller attached to each of its two ends; and
   supports for the rollers attached to the apparatus to support the rollers at each of the two ends of the blade.

2. The apparatus of claim 1, wherein the apparatus is a modular apparatus formed of modular units having compatible sizes, shapes, and configurations.

3. The apparatus of claim 2, wherein each of the modular units have modular support structures.

4. The apparatus of claim 1, wherein the plurality of gravity separation air flotation units comprises a gravity separation air flotation unit that has been inserted between the intake unit and the discharge unit.

5. The apparatus of claim 1, wherein each of the plurality of gravity separation air flotation units contain a standard housing element having a standard shape, size, and configuration in the unit.

6. The apparatus of claim 5, wherein each of the plurality of gravity separation air flotation units contain an identical rectangular side panel.

7. The apparatus of claim 1:
   wherein the intake unit and the discharge unit each contain an end panel having a particular horizontal length;
   wherein each of the plurality of gravity separation air flotation units have a side panel having a second horizontal length that is the same as the particular length; and
   wherein each of the plurality of gravity separation air flotation units contain four identical trapezoidal panels that have a third horizontal length along a longest side thereof that is the same as the particular length.

8. The apparatus of claim 1, wherein a gravity separation air floatation unit of the plurality is connected to another unit by nuts and bolts to allow the gravity separation air floatation unit to be separated from the other unit.

9. The apparatus of claim 1, wherein the intake unit comprises a split manifold.

10. The apparatus of claim 1, wherein the intake unit comprises an opening to accommodate flow from a conduit.

11. The apparatus of claim 1, wherein the discharge unit comprises a filter.

12. A wastewater treatment apparatus to remove particulate contaminants from a wastewater, comprising:
   a plurality of gravity separation air flotation units that each contain an upper housing to remove floatable particulate contaminants and a lower conical housing to remove gravity separable particulate contaminants;
   a plurality of rakes corresponding to the plurality of gravity separation air flotation units, the rakes each having an attached blade to remove a floc blanket from the top of one of the plurality of gravity separation air flotation units, the attached blade having a roller attached to each of its two ends; and
   supports for the rollers attached to the apparatus at each of the ends of the blades for each of the rakes.

13. The apparatus of claim 12:
   wherein the plurality of gravity separation air flotation units each comprise a plurality of standard housing elements; and
   wherein the plurality of standard housing elements comprise a rectangular side panel belonging to the upper housing and a trapezoidal side panel belonging to the lower conical housing.

14. The apparatus of claim 12:
   wherein each of the upper housings are formed of a first plurality of standardized housing elements; and
   wherein each of the lower housings are formed of a second plurality of standardized housing elements.

15. The apparatus of claim 14:
   wherein the first plurality of standardized housing elements comprise a pair of identical side panels; and
   wherein the second plurality of standardized housing elements comprise four identical trapezoidal panels.

16. The apparatus of claim 12:
   wherein a first lower conical housing of the plurality comprises a first plurality of identical panels that are each attached to two other panels of the first plurality along edges thereof;
   further comprising a tank coupled with the lower conical housing by a line to receive sludge from the lower conical housing, the tank containing a second lower conical housing comprising a second plurality of identical panels that are each attached to two other panels of the second plurality along edges thereof; and wherein each of the first plurality of panels have the same shape and size as each of the second plurality of panels.

17. The apparatus of claim 12, further comprising an intake unit containing a split manifold and an opening to accommodate flow from a conduit.

18. The apparatus of claim 12, further comprising a discharge unit containing a filter.

19. A wastewater treatment apparatus to decontaminate a wastewater comprising:

a wastewater intake unit;

a decontaminated water discharge unit;

a plurality of gravity separation air flotation units connected together and connected between the intake unit and the discharge unit;

a plurality of rakes corresponding to the plurality of gravity separation air flotation units, the rakes each having an attached blade to remove a floc blanket from the top of one of the plurality of gravity separation air flotation units, the attached blade having a roller attached to each of its two ends; and supports for the rollers attached to the apparatus at each of the ends of the blades for each of the rakes.

20. The apparatus of claim 19, wherein the apparatus is a modular apparatus formed of modular units having compatible sizes, shapes, and configurations.

21. The apparatus of claim 20, wherein each of the modular units have modular support structures.

22. The apparatus of claim 19, wherein the plurality of gravity separation air flotation units comprises a gravity separation air flotation unit that has been inserted between the intake unit and the discharge unit.

23. The apparatus of claim 19, wherein each of the plurality of gravity separation air flotation units contain a standard housing element having a standard shape, size, and configuration in the unit.

24. The apparatus of claim 23, wherein each of the plurality of gravity separation air flotation units contain an identical rectangular side panel.

25. The apparatus of claim 19:

wherein the intake unit and the discharge unit each contain an end panel having a particular horizontal length;

wherein each of the plurality of gravity separation air flotation units have a side panel having a second horizontal length that is the same as the particular length; and wherein each of the plurality of gravity separation air flotation units contain four identical trapezoidal panels that have a third horizontal length along a longest side thereof that is the same as the particular length.

26. The apparatus of claim 19, wherein a gravity separation air floatation unit of the plurality is connected to another unit by nuts and bolts to allow the gravity separation air floatation unit to be separated from the other unit.

27. The apparatus of claim 19, wherein the intake unit comprises a split manifold.

28. The apparatus of claim 19, wherein the intake unit comprises an opening to accommodate flow from a conduit.

29. The apparatus of claim 19, wherein the discharge unit comprises a filter.

* * * * *